(12) United States Patent
Aguera y Arcas et al.

(10) Patent No.: US 10,579,442 B2
(45) Date of Patent: *Mar. 3, 2020

(54) INVERSION-OF-CONTROL COMPONENT SERVICE MODELS FOR VIRTUAL ENVIRONMENTS

(71) Applicant: Microsoft Technology Licensing, LLC, Redmond, WA (US)

(72) Inventors: Blaise Aguera y Arcas, Seattle, WA (US); Hen Fitoussi, Tel-Aviv (IL); John Daniell Hebert, San Francisco, CA (US); Benny Schlesinger, Ramat Hasharon (IL); Eran Yariv, Zichron Yaakov (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 321 days.

This patent is subject to a terminal disclaimer.

(21) Appl. No.: 15/433,034

(22) Filed: Feb. 15, 2017

(65) Prior Publication Data

US 2017/0161118 A1    Jun. 8, 2017

Related U.S. Application Data

(63) Continuation of application No. 13/714,607, filed on Dec. 14, 2012, now Pat. No. 9,600,351.

(51) Int. Cl.
*G06F 9/54* (2006.01)
*G06F 9/455* (2018.01)

(52) U.S. Cl.
CPC ............... *G06F 9/54* (2013.01); *G06F 9/455* (2013.01); *G06F 9/542* (2013.01)

(58) Field of Classification Search
None
See application file for complete search history.

(56) References Cited

U.S. PATENT DOCUMENTS

| 5,117,349 A | 5/1992 | Tirfing et al. |
| 5,506,984 A | 4/1996 | Miller |
| (Continued) | | |

FOREIGN PATENT DOCUMENTS

| CN | 1808430 A | 7/2006 |
| CN | 1989486 A | 6/2007 |
| (Continued) | | |

OTHER PUBLICATIONS

"Office Action Issued in European Patent Application No. 13818093. 0", dated Feb. 13, 2018, 7 Pages.

(Continued)

*Primary Examiner* — Eric C Wai
(74) *Attorney, Agent, or Firm* — Drinker Biddle & Reath LLP

(57) ABSTRACT

In the field of computing, many scenarios involve the execution of an application within a virtual environment of a device (e.g., web applications executing within a web browser). Interactions between applications and device components are often enabled through hardware abstractions or component application programming interfaces (API), but such interactions may provide more limited and/or inconsistent access to component capabilities for virtually executing applications than for native applications. Instead, the device may provide hardware interaction as a service to the virtual environment utilizing a callback model, wherein applications within the virtual environment initiate component request specifying a callback, and the device initiates the component requests with the components and invokes associated callbacks upon completion of a component request. This model may enable the applications to interact (Continued)

with the full capability set of the components, and may reduce blocked execution of the application within the virtual application in furtherance of application performance.

20 Claims, 10 Drawing Sheets

(56) References Cited

U.S. PATENT DOCUMENTS

| | | |
|---|---|---|
| 5,701,469 A | 12/1997 | Brandli et al. |
| 5,913,208 A | 6/1999 | Brown et al. |
| 5,943,670 A | 8/1999 | Prager |
| 6,268,852 B1 | 7/2001 | Lindhorst et al. |
| 6,278,992 B1 | 8/2001 | Curtis et al. |
| 6,374,296 B1 | 4/2002 | Lim et al. |
| 6,393,420 B1 | 5/2002 | Peters |
| 6,434,745 B1 | 8/2002 | Conley et al. |
| 6,460,060 B1 | 10/2002 | Maddalozzo et al. |
| 6,496,843 B1 | 12/2002 | Getchius et al. |
| 6,542,889 B1 | 4/2003 | Aggarwal et al. |
| 6,578,056 B1 | 6/2003 | Lamburt |
| 6,625,804 B1 | 9/2003 | Ringseth et al. |
| 6,654,758 B1 | 11/2003 | Teague |
| 6,704,722 B2 | 3/2004 | Wang Baldonado |
| 6,704,727 B1 | 3/2004 | Kravets |
| 6,807,539 B2 | 10/2004 | Miller et al. |
| 6,879,982 B2 | 4/2005 | Shirasaka |
| 7,013,303 B2 | 3/2006 | Faybishenko et al. |
| 7,099,861 B2 | 8/2006 | Youn |
| 7,296,025 B2 | 11/2007 | Kung et al. |
| 7,424,501 B2 | 9/2008 | Macy, Jr. |
| 7,505,978 B2 | 3/2009 | Bodin et al. |
| 7,559,065 B1 | 7/2009 | Sosnovsky et al. |
| 7,591,003 B2 | 9/2009 | Focke et al. |
| 7,698,316 B2 | 4/2010 | Song et al. |
| 7,703,040 B2 | 4/2010 | Cutrell et al. |
| 7,707,152 B1 | 4/2010 | Greenfield et al. |
| 7,730,079 B2 | 6/2010 | Meijer et al. |
| 7,774,361 B1 | 8/2010 | Nachenberg et al. |
| 7,831,685 B2 | 11/2010 | Dai et al. |
| 7,987,420 B1 | 7/2011 | Kloba et al. |
| 8,161,498 B2 | 4/2012 | Atkin et al. |
| 8,418,192 B1 | 4/2013 | Sosnovsky et al. |
| 8,471,701 B2 | 6/2013 | Yariv et al. |
| 8,726,278 B1 | 5/2014 | Shawver et al. |
| 8,762,759 B2 | 6/2014 | Williams et al. |
| 8,806,451 B2 | 8/2014 | Zheng et al. |
| 9,075,672 B2 | 7/2015 | Beckman et al. |
| 9,317,255 B2 | 4/2016 | Meijer et al. |
| 9,600,351 B2 | 3/2017 | Aguera y Arcas et al. |
| 2001/0054045 A1 | 12/2001 | Shirasaka |
| 2001/0056371 A1 | 12/2001 | Shuster |
| 2001/0056418 A1 | 12/2001 | Youn |
| 2002/0023122 A1 | 2/2002 | Polizzi et al. |
| 2002/0032772 A1 | 3/2002 | Olstad et al. |
| 2002/0033844 A1 | 3/2002 | Levy et al. |
| 2002/0069218 A1 | 6/2002 | Sull et al. |
| 2002/0194161 A1 | 12/2002 | Mcnamee et al. |
| 2003/0131005 A1 | 7/2003 | Berry |
| 2003/0158839 A1 | 8/2003 | Faybishenko et al. |
| 2003/0167261 A1 | 9/2003 | Grust et al. |
| 2003/0233351 A1 | 12/2003 | Naeve et al. |
| 2004/0128616 A1 | 7/2004 | Kraft |
| 2004/0133639 A1 | 7/2004 | Shuang et al. |
| 2004/0143564 A1 | 7/2004 | Gross et al. |
| 2004/0165207 A1 | 8/2004 | Kashiwagi |
| 2004/0205046 A1 | 10/2004 | Cohen et al. |
| 2004/0230571 A1 | 11/2004 | Robertson |
| 2005/0050014 A1 | 3/2005 | Gosse et al. |
| 2005/0097089 A1 | 5/2005 | Nielsen et al. |
| 2005/0114306 A1 | 5/2005 | Shu et al. |
| 2005/0149496 A1 | 7/2005 | Mukherjee et al. |
| 2005/0149500 A1 | 7/2005 | Marmaros et al. |
| 2005/0154722 A1 | 7/2005 | Seitz et al. |
| 2005/0165743 A1 | 7/2005 | Bharat et al. |
| 2005/0165754 A1 | 7/2005 | Valliappan et al. |
| 2005/0198612 A1 | 9/2005 | Gonzalez |
| 2005/0203887 A1 | 9/2005 | Joshi et al. |
| 2005/0278308 A1 | 12/2005 | Barstow |
| 2006/0031206 A1 | 2/2006 | Deubel et al. |
| 2006/0041606 A1 | 2/2006 | Sawdon |
| 2006/0053157 A1 | 3/2006 | Pitts |
| 2006/0136564 A1 | 6/2006 | Ambrose |
| 2006/0184540 A1 | 8/2006 | Kung et al. |
| 2006/0212736 A1 | 9/2006 | Kimura |
| 2006/0235873 A1 | 10/2006 | Thomas |
| 2006/0277207 A1 | 12/2006 | Ure |
| 2007/0038665 A1 | 2/2007 | Kwak et al. |
| 2007/0040834 A1 | 2/2007 | Panesar et al. |
| 2007/0043704 A1 | 2/2007 | Raub et al. |
| 2007/0043750 A1 | 2/2007 | Dingle |
| 2007/0050347 A1 | 3/2007 | Meijer et al. |
| 2007/0073704 A1 | 3/2007 | Bowden et al. |
| 2007/0078822 A1 | 4/2007 | Cucerzan et al. |
| 2007/0088686 A1 | 4/2007 | Hurst-hiller et al. |
| 2007/0094042 A1 | 4/2007 | Ramer et al. |
| 2007/0112757 A1 | 5/2007 | Bates et al. |
| 2007/0118609 A1 | 5/2007 | Mullan et al. |
| 2007/0124363 A1 | 5/2007 | Lurie et al. |
| 2007/0136457 A1 | 6/2007 | Dai et al. |
| 2007/0175674 A1 | 8/2007 | Brinson et al. |
| 2007/0192327 A1 | 8/2007 | Bodin et al. |
| 2007/0226242 A1 | 9/2007 | Wang et al. |
| 2007/0271247 A1 | 11/2007 | Best et al. |
| 2008/0005079 A1 | 1/2008 | Flake et al. |
| 2008/0010676 A1 | 1/2008 | Dosa racz et al. |
| 2008/0016037 A1 | 1/2008 | Enomoto et al. |
| 2008/0071742 A1 | 3/2008 | Yang et al. |
| 2008/0071763 A1 | 3/2008 | Ferrenq et al. |
| 2008/0082513 A1 | 4/2008 | Oral et al. |
| 2008/0147641 A1 | 6/2008 | Leffingwell et al. |
| 2008/0147655 A1 | 6/2008 | Sinha et al. |
| 2008/0147671 A1 | 6/2008 | Simon et al. |
| 2008/0154877 A1 | 6/2008 | Joshi et al. |
| 2008/0178162 A1 | 7/2008 | Sanford et al. |
| 2008/0229231 A1 | 9/2008 | Delia et al. |
| 2008/0243783 A1 | 10/2008 | Santi et al. |
| 2009/0063421 A1 | 3/2009 | Burson et al. |
| 2009/0063448 A1 | 3/2009 | Depue et al. |
| 2009/0144229 A1 | 6/2009 | Meijer et al. |
| 2009/0248619 A1 | 10/2009 | Das et al. |
| 2009/0259863 A1 | 10/2009 | Williams et al. |
| 2009/0265367 A1 | 10/2009 | Corbett |
| 2009/0293073 A1 | 11/2009 | Nathan et al. |
| 2009/0327261 A1 | 12/2009 | Hawkins |
| 2009/0327270 A1 | 12/2009 | Teevan et al. |
| 2010/0107139 A1 | 4/2010 | Bireley et al. |
| 2010/0114885 A1 | 5/2010 | Bowers et al. |
| 2010/0205208 A1 | 8/2010 | Walker |
| 2010/0333201 A1 | 12/2010 | Haviv et al. |
| 2011/0066951 A1 | 3/2011 | Ward-karet et al. |
| 2011/0093434 A1 | 4/2011 | Arora et al. |
| 2011/0161840 A1 | 6/2011 | Wong et al. |
| 2011/0173621 A1 | 7/2011 | Meijer et al. |
| 2011/0239108 A1 | 9/2011 | Blomquist et al. |
| 2011/0275040 A1 | 11/2011 | de la Torre Paniagua et al. |
| 2011/0302630 A1 | 12/2011 | Nair et al. |
| 2012/0036494 A1 | 2/2012 | Gurumohan et al. |
| 2012/0072442 A1 | 3/2012 | De Smet et al. |
| 2012/0072985 A1 | 3/2012 | Davne et al. |
| 2012/0117644 A1 | 5/2012 | Soeder |
| 2012/0254842 A1 | 10/2012 | Henderson |
| 2012/0260250 A1 | 10/2012 | Maeda et al. |
| 2012/0284237 A1 | 11/2012 | Li et al. |
| 2012/0310527 A1 | 12/2012 | Yariv et al. |
| 2012/0330812 A1 | 12/2012 | Bouchard |
| 2013/0013921 A1 | 1/2013 | Bhathena et al. |
| 2013/0091197 A1 | 4/2013 | Bar-Zeev et al. |
| 2013/0097440 A1 | 4/2013 | Bar-Zeev et al. |
| 2013/0103715 A1 | 4/2013 | Beckman et al. |

(56) References Cited

U.S. PATENT DOCUMENTS

| | | | |
|---|---|---|---|
| 2013/0263127 A1 | 10/2013 | y Arcas et al. | |
| 2019/0020733 A1 | 1/2019 | Bar-Zeev et al. | |

FOREIGN PATENT DOCUMENTS

| | | | |
|---|---|---|---|
| CN | 101312457 | A | 11/2008 |
| CN | 101315600 | A | 12/2008 |
| CN | 101331475 | A | 12/2008 |
| CN | 101849228 | A | 9/2010 |
| CN | 101854371 | A | 10/2010 |
| CN | 102158516 | A | 8/2011 |
| CN | 102200911 | A | 9/2011 |
| CN | 102656561 | A | 9/2012 |
| JP | H0728736 | A | 1/1995 |
| JP | H09167097 | A | 6/1997 |
| JP | 2006260372 | A | 9/2006 |
| JP | 2008158637 | A | 7/2008 |
| KR | 20020032060 | A | 5/2002 |
| KR | 20030082109 | A | 10/2003 |
| KR | 20030082110 | A | 10/2003 |
| WO | 2005066842 | A1 | 7/2005 |

OTHER PUBLICATIONS

"Inversion of Control", Retrieved from <<msdn.microsoft.com/en-us/library/ff921087.aspx>>, Retrieved Date: Aug. 1, 2012, 4 Pages.
"Final Office Action Issued in U.S. Appl. No. 13/714,607", dated Aug. 26, 2015, 9 Pages.
"Non Final Office Action Issued in U.S. Appl. No. 13/714,607", dated Feb. 16, 2016, 13 Pages.
"Notice of Allowance Issued in U.S. Appl. No. 13/714,607", dated Nov. 9, 2016, 5 Pages.
Gamma, et al., "Design Patterns, Elements of Reusable Object-Oriented-Software, Visitor Pattern, Structural Patterns", Published by Pearson Education India, Addison-Wesley Professional Computing series, Apr. 1, 2005, pp. 207-217.
Gamma, E, et al., "Design Patterns, Passage", Published by Pearson Education India, Addison-Wesley Professional Computing series, Jan. 1, 1995, pp. 139-143.
Nagy, Steven, "Above the Cloud »inversion of control", Retrieved from <<web.archive.org/web/20120318124904/www.azure.snagy.name/blog/?tag=inversion-of-control>>, Oct. 25, 2009, 2 Pages.
"International Search Report and Written Opinion Issued in PCT Application No. PCT/US2013/075200", dated Mar. 6, 2014, 9 Pages.
"Effective Stored JavaScript in MongoDB", Retrieved from web.archive.org/web/20110820230333/http://vasilrem.com/blog/software-development/stored-javascript-in-mongo/, Retrieved on Aug. 25, 2011, 5 Pages.
"Enumerable Methods", Retrieved from msdn.microsoft.com/en-us/library/bb341635(d=printer).aspx, Retrieved on Sep. 14, 2011, 17 Pages.
"Flamenco Search", Retrieved from bailando.sims.berkeley.edu/flamenco.html, Retrieved on Mar. 3, 20081 Page.
"Google Desktop", Retrieved from web.archive.org/web/20080418224533/http://desktop.google.com/features.html, Oct. 14, 2004, 3 Pages.
"ICDL—International Children's Digital Library", Retrieved from http://www.icdlbooks.org, Retrieved on Mar. 3, 2008, 3 Pages.
"Kinect Geeks [Series 5] User Generator", Published by Kogakusha Co., vol. 36, No. 8, Aug. 1, 2011, 3 Pages.
Zhang, et al., "Mining Multiple Data Sources: Local Pattern Analysis", in Journal of Data Mining and Knowledge Discovery, vol. 12, Issue 2-3, May 1, 2006, 5 Pages.
"mSpace", Retrieved from web.archive.org/web/20080313023432/http://mspace.fm, Retrieved on Mar. 3, 2008, 2 Pages.
"Papers from the Placeless Documents Project", Retrieved from web.archive.org/web/20080122010539/http://www2.parc.com/csl/projects/placeless/papers/, Retrieved on Mar. 3, 2008, 4 Pages.

"Representational State Transfer (REST)", Retrieved from https://www.packetizer.com/ws/rest.html, Retrieved on Oct. 4, 2011, 6 Pages.
Zammetti, Frank W., "Practical Palm Pre WebOS Projects", Published by Apress, 2009, 24 Pages.
Caldato, Claudio, "The WebSockets Prototype Gets Another Update", Retrieved from blogs.msdn.microsoft.com/interoperability/2011/02/25/the-websockets-prototype-gets-another-update-2/, Feb. 25, 2011, 4 Pages.
"Using the Palm WebOS Platform with Microsoft Exchange Server.", Retrieved from web.archive.org/web/20110617213246/http://www.hpwebos.com/us/assets/pdfs/business/Palm_WhitePaper_05_exchange.pdf, Jun., 2011, 9 Pages.
"Walkthrough: Creating an IQueryable LINQ Provider", Retrieved from msdn.microsoft.com/en-us/library/bb546158.aspx, Retrieved on Aug. 25, 2011, 24 Pages.
"Welcome to Google Enterprise", Retrieved from web.archive.org/web/20110930142748/http://www.google.com/enterprise/enterprise_solutions/education.html, Retrieved on Oct. 19, 2011, 2 Pages.
"X Window System—Wikipedia", Retrieved from https://en.wikipedia.org/w/index.php?title=X_Window_System&oldid=365473895, Jun. 1, 2010, 17 Pages.
"Corrected Search Report Issued in European Patent Application No. 08798392", dated Jan. 26, 2011, 5 Pages.
"Extended Search Report Issued in European Patent Application No. 08798392", dated Nov. 23, 2010, 4 Pages.
"Office Action Issued in Korean Patent Application No. 10-2014-7009554", dated Aug. 22, 2018, 7 Pages.
"Final Office Action Issued in U.S. Appl. No. 11/172,365", dated Aug. 6, 2008, 31 Pages.
"Non Final Office Action Issued in U.S. Appl. No. 11/172,365", dated Nov. 6, 2007, 21 Pages.
"Non Final Office Action Issued in U.S. Appl. No. 11/172,365", dated Jul. 10, 2009, 35 Pages.
"Non Final Office Action Issued in U.S. Appl. No. 11/172,365", dated Dec. 26, 2008, 36 Pages.
"Final Office Action Issued in U.S. Appl. No. 11/846,621", dated Oct. 28, 2013, 29 Pages.
"Final Office Action Issued in U.S. Appl. No. 11/846,621", dated Jan. 27, 2012, 24 Pages.
"Final Office Action Issued in U.S. Appl. No. 11/846,621", dated Nov. 18, 2010, 19 Pages.
"Final Office Action Issued in U.S. Appl. No. 11/846,621", dated Mar. 1, 2010, 18 Pages.
"Non Final Office Action Issued in U.S. Appl. No. 11/846,621", dated Oct. 9, 2009, 16 Pages.
"Non Final Office Action Issued in U.S. Appl. No. 11/846,621", dated Jun. 7, 2010, 16 Pages.
"Non Final Office Action Issued in U.S. Appl. No. 11/846,621", dated Sep. 29, 2011, 21 Pages.
"Non Final Office Action Issued in U.S. Appl. No. 11/846,621", dated May 17, 2013, 28 Pages.
"Final Office Action Issued in U.S. Appl. No. 12/145,522", dated Mar. 30, 2011, 29 Pages.
"Non Final Office Action Issued in U.S. Appl. No. 12/145,522", dated Oct. 21, 2010, 25 Pages.
"Non Final Office Action Issued in U.S. Appl. No. 12/145,522", dated May 8, 2012, 35 Pages.
"Office Action Issued in European Patent Application No. 12839717.1", dated Jul. 20, 2018, 6 Pages.
"Office Action Issued in European Patent Application No. 12839717.1", dated Apr. 11, 2017, 6 Pages.
"Office Action Issued in European Patent Application No. 12839717.1", dated Mar. 5, 2018, 5 Pages.
"Supplementary Search Report Issued in European Patent Application No. 12839717.1", dated Oct. 14, 2015, 6 Pages.
"Supplementary Search Report Issued in European Patent Application No. 12858967.8", dated Sep. 29, 2015, 7 Pages.
"Non Final Office Action Issued in U.S. Appl. No. 13/279,245", dated Apr. 10, 2014, 11 Pages.
"Final Office Action Issued in U.S. Appl. No. 13/334,062", dated Jan. 14, 2016, 17 Pages.
"Final Office Action Issued in U.S. Appl. No. 13/334,062", dated Nov. 20, 2014, 15 Pages.

(56) References Cited

OTHER PUBLICATIONS

"Non Final Office Action Issued in U.S. Appl. No. 13/334,062", dated Apr. 11, 2013, 13 Pages.
"Non Final Office Action Issued in U.S. Appl. No. 13/334,062", dated Aug. 22, 2013, 13 Pages.
"Non Final Office Action Issued in U.S. Appl. No. 13/334,062", dated May 19, 2015, 16 Pages.
"Non Final Office Action Issued in U.S. Appl. No. 13/334,062", dated May 2, 2014, 14 Pages.
"Non Final Office Action Issued in U.S. Appl. No. 13/334,065", dated Apr. 24, 2013, 16 Pages.
"Final Office Action Issued in U.S. Appl. No. 13/650,022", dated Jun. 4, 2015, 17 Pages.
"Pre-Interview First Office Action Issued in U.S. Appl. No. 13/650,022", dated Jul. 31, 2014, 4 Pages.
"Pre-Interview First Office Action Issued in U.S. Appl. No. 13/714,607", dated Apr. 17, 2015, 5 Pages.
"Notice of Allowance Issued in Korean Patent Application No. 10-2014-7009554", dated Dec. 27, 2018, 5 Pages.
"Office Action Issued in European Patent Application No. 12839717.1", dated Jan. 18, 2019, 5 Pages.
"Office Action Issued in Canadian Patent Application No. 2,851,514", dated Feb. 19, 2019, 3 Pages.
"First Office Action and Search Report Issued in Chinese Patent Application No. 201380065171.6", dated Sep. 18, 2017, 12 Pages.
"Non Final Office Action Issued in U.S. Appl. No. 13/937,968", dated Jul. 10, 2015, 14 Pages.
"Non Final Office Action Issued in U.S. Appl. No. 14/749,780", dated Dec. 3, 2015, 7 Pages.
"Non Final Office Action Issued in U.S. Appl. No. 15/156,842", dated Jan. 26, 2018, 20 Pages.
"Office Action Issued in Canadian Patent Application No. 2,851,514", dated Aug. 3, 2018, 4 Pages.
"First Office Action Issued in Chinese Patent Application No. 200880105215.2", dated Jul. 21, 2011, 16 Pages.
"Office Action Issued in Chinese Patent Application No. 200880105215.2", dated Feb. 18, 2013, 8 Pages.
"Second Office Action Issued in Chinese Patent Application No. 200880105215.2", dated Mar. 1, 2012, 9 Pages.
"Third Office Action Issued in Chinese Patent Application No. 200880105215.2", dated Aug. 3, 2012, 9 Pages.
"First Office Action and Search Report Issued in Chinese Patent Application No. 201210405280.5", dated Jun. 3, 2014, 12 Pages.
"First Office Action and Search Report Issued in Chinese Patent Application No. 201210563961.4", dated Apr. 3, 2015, 17 Pages.
"Second Office Action Issued in Chinese Patent Application No. 201210563961.4", dated Oct. 28, 2015, 26 Pages.
"Third Office Action Issued in Chinese Patent Application No. 201210563961.4", dated Apr. 28, 2016, 13 Pages.
"Office Action Issued in Australian Patent Application No. 2012322684", dated Mar. 17, 2017, 3 Pages.
"First Office Action and Search Report Issued in Chinese Patent Application No. 201280061010.5", dated Aug. 30, 2016, 13 Pages.
"Second Office Action Issued in Chinese Patent Application No. 201380065171.6", dated Apr. 10, 2018, 5 Pages.
"Office Action Issued in Russian Patent Application No. 2014114277", dated Aug. 26, 2016, 5 Pages.
"Office Action Issued in Japanese Patent Application No. 2014-535891", dated Jul. 20, 2016, 9 Pages.
Aijaz, et al., "The Resource-Oriented Mobile Web Server for Long-Lived Services", in Proceedings of the IEEE 6th International Conference on Wireless and Mobile Computing, Networking and Communications, Oct. 11, 2010, 7 Pages.
Allen, Mitch, "Palm WebOS", Published by O'reilly Media Inc., Aug. 2009, 114 Pages.
Biao, et al., "High Design of Server for Smartphone Application", in Proceedings of IEICE General Conference, Retrieved on Oct. 4, 2011, 2 Pages.
Blandford, Rafe, "Previewing Nokia's Mobile Web Server", Retrieved from www.allaboutsymbian.com/features/item/Previewing_Nokias_Mobile_Web_Server.php, Jun. 18, 2007, 12 Pages.
Calishain, Tara, "Google Hacks, 2nd Edition", Published by O'Reilly, Dec. 2004, 10 Pages.
Carughi, Giovanni Toffetti, "Modeling Data-Intensive Rich Internet Applications with Server Push Support", in Journal of Model-Driven Web Engineering, vol. 261, Jul. 17, 2007, 16 Pages.
Dornfest, Rael, "Google Your Desktop", Published by O'reilly, Oct. 14, 2004, 8 Pages.
Duhl, Joshua, "Rich Internet Applications", in Journal of IDC Report 3906, Nov. 2003, 34 Pages.
Wesdyer, "The Marvels of Monads", Retrieved from blogs.msdn.microsoft.com/wesdyer/2008/01/10/the-marvels-of-monads/, Jan. 10, 2008, 29 Pages.
Gerner, et al., "Automatic Client-Server Partitioning of Data-Driven Web Applications", in Proceedings of the ACM SIGMOD international Conference on Management of Data, Jun. 27, 2006, 3 Pages.
Ghanem, et al., "Databases Deepen the Web", in Journal of Computer, vol. 37, Issue 1, Jan. 2004, pp. 116-117.
Griffin, et al., "Scaling Instant Messaging Communication Services", in Proceedings of IEEE Symposium on Computers and Communications, Jun. 28, 2011, 8 Pages.
Grossman, et al., "IIT Intranet Mediator: Bringing Data Together on a Corporate Intranet", in Journal of IT Professional, vol. 4, Issue 1, Jan. 2002, pp. 35-40.
"Microsoft Windows XP—Copyright 2001", 2001, 3 Pages.
Malouf, David Heller, "RIAs: The Technology is Exciting, But They Really Do Help Users", Retrieved from www.uxmatters.com/MT/archives/000041.php, Dec. 6, 2005, 13 Pages.
Kozel, et al., "Mobile Access into Information Systems", in Proceedings of the 30th International Conference on Information Technology Interfaces, Jun. 23, 2008, pp. 851-856.
Nauer, et al., "Using of Multiple Data Source for Information Filtering: First Approaches in the MedExplore Project", in Proceedings of 5th DELOS Workshop on Filtering and Collaborative Filtering, Nov. 1997, 10 Pages.
Park, Will, "Run a Web-Server on your Android Mobile Phone with iJetty", Retrieved from www.intomobile.com/2008/03/17/run-a-web-server-on-your-android-mobile-phone-with-ijetty/, Mar. 17, 2008, 8 Pages.
"International Search Report and Written Opinion Issued in PCT Application No. PCT/US12/59832", dated Mar. 29, 2013, 9 Pages.
"International Search Report and Written Opinion Issued in PCT Application No. PCT/US12/69979", dated Apr. 5, 2013, 10 Pages.
"International Search Report and Written Opinion Issued in PCT Application No. PCT/US2008/073890", dated Mar. 20, 2009, 14 Pages.
Schreiber, et al., "Thirteen New Players in the Team: A Ferry-Based LINQ to SQL Provider", in Proceedings of the VLDB Endowment, vol. 3, No. 2, Sep. 1, 2010, 4 Pages.
Shimizu, Toshihiro, "Create Scalable Web Application ~ Get to Know Server Side Java Script Node.js", Published by Gijutsu Hyoron Publishing Co Ltd, Sep. 18, 2011, 8 Pages.
"Macintosh Older Protocols Software", Retrieved from www.macorchard.com/gopher.html., Retrieved on Mar. 3, 2008, 5 Pages.
Thimmappa, Chethan, "How to Run a Web Server on S60 Mobile Phones", Retrieved from www.chaaps.com/how-to-run-a-web-server-on-s60-mobile-phones.html, Sep. 5, 2010, 11 Pages.
Tilkov, et al., "Using JavaScript to Build High-Performance Network Programs", in Proceedings of IEEE Internet Computing, vol. 14, Issue 6, Nov. 2010, 4 Pages.
Zafar, Kamran, "kWS—Android Web Server", Retrieved from web.archive.org/web/20111003001436/http://www.androidzoom.com/android_applications/communication/kws-android-web-server_hlfb.html, Retrieved on Oct. 4, 2011, 3 Pages.
"The Revolution for Interacting with the Web", Retrieved from web.archive.org/web/20081202051139/http://www.softguide.com/pj/2836/flex.htm, Retrieved on Apr. 17, 2008, 3 Pages.
Grust, Torsten, "Monad Comprehensions: A Versatile Representation for Queries", in Proceedings of the Functional Approach to Data Management—Modeling, Analyzing and Integrating Heterogeneous Data, Sep. 2003, pp. 288-311.

(56) References Cited

OTHER PUBLICATIONS

"Office Action Issued in European Patent Application No. 12839717.1", dated Aug. 12, 2019, 6 Pages.
"Office Action Issued in Brazilian Patent Application No. BR112014008762-8", dated Dec. 4, 2019, 5 Pages.

INVERSION-OF-CONTROL COMPONENT SERVICE MODELS FOR VIRTUAL ENVIRONMENTS

CROSS-REFERENCE TO RELATED APPLICATIONS

This application is a continuation of U.S. patent application Ser. No. 13/714,607, filed Dec. 14, 2012, entitled "Inversion-of-Control Component Service Models for virtual Environments," now U.S. Pat. No. 9,600,351, which is hereby incorporated by reference.

BACKGROUND

Within the field of computing, many scenarios involve an execution of applications within a virtual environment of a device, such as web applications executing within a web browser; code that is developed for a computational environment other than that provided by the device (e.g., Java code designed for a Java virtual machine); and untrusted code executing within an isolated virtual machine. The execution of the application within the virtual machine, rather than as a native process of the device, may facilitate the compatibility and security of the application during execution.

Such applications often invoke requests directed to a hardware or software component of the device. For example, a graphics hardware component may provide a rendering function (e.g., rendering an image of a three-dimensional scene) that may be invoked by various applications execution on the device. Such hardware components may be readily accessible to native applications executing with the computing environment of the device, and may be exposed on a more limited basis to applications executing within a virtual environment of the device. For example, a graphics rendering component may provide comparatively low-level and extensive access by applications, and may provide more constrained rendering capabilities on behalf of web applications executing within a web browser. Such restrictions may be implemented as selected and/or appropriate in view of a less trusted code environment provided by the virtual environment (e.g., code running in a web browser is typically ascribed a lower level of trust than native code that has been installed on the device) and/or based on abstractions of the components within the virtual environment (e.g., rather than providing device-specific capabilities of a hardware component, a virtual environment may present a generalized set of capabilities supported by many hardware components and devices). Finally, many virtual environments may enable the application to invoke the capabilities of the devices, but may block execution of the application until the invocation of the capabilities of the device is complete.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The typical models of the interaction of applications within a virtual environment with device components may present some disadvantages. As a first example, the applications may be unable to access a broad range of capabilities of the components. As a second example, the efficiency of component invocations in this model may be diminished by the inability of the device to utilize component-specific features or optimization techniques. As a third example, blocking the web application until the component request is complete may significantly impair the performance of the web application.

Presented herein are techniques for fulfilling component requests of applications in a manner that may address some of these disadvantages and/or enable additional advantages. In accordance with these techniques, the device may facilitate the handling of component requests from applications within a virtual environment through an inversion-of-control mechanism via a callback mechanism. An application executing within the virtual environment may initiate a component request involving one or more components and/or component capabilities of the computing environment, and specifying a callback of the application to be invoked upon completion of the component request. The device may fulfill this component request by storing an association of the application, the identified component and/or component capability, and then sending the component request to the associated component. The device may then resume execution of the application within the virtual environment. When the device later detects a completion of the component request by the component, the device may identify one or more callbacks associated with the component request, and may invoke the callbacks in order to perform processing on the results of the component request and/or to notify the applications of the completion of the component request. This model may expedite the fulfillment of component requests issued by applications within a virtual environment.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
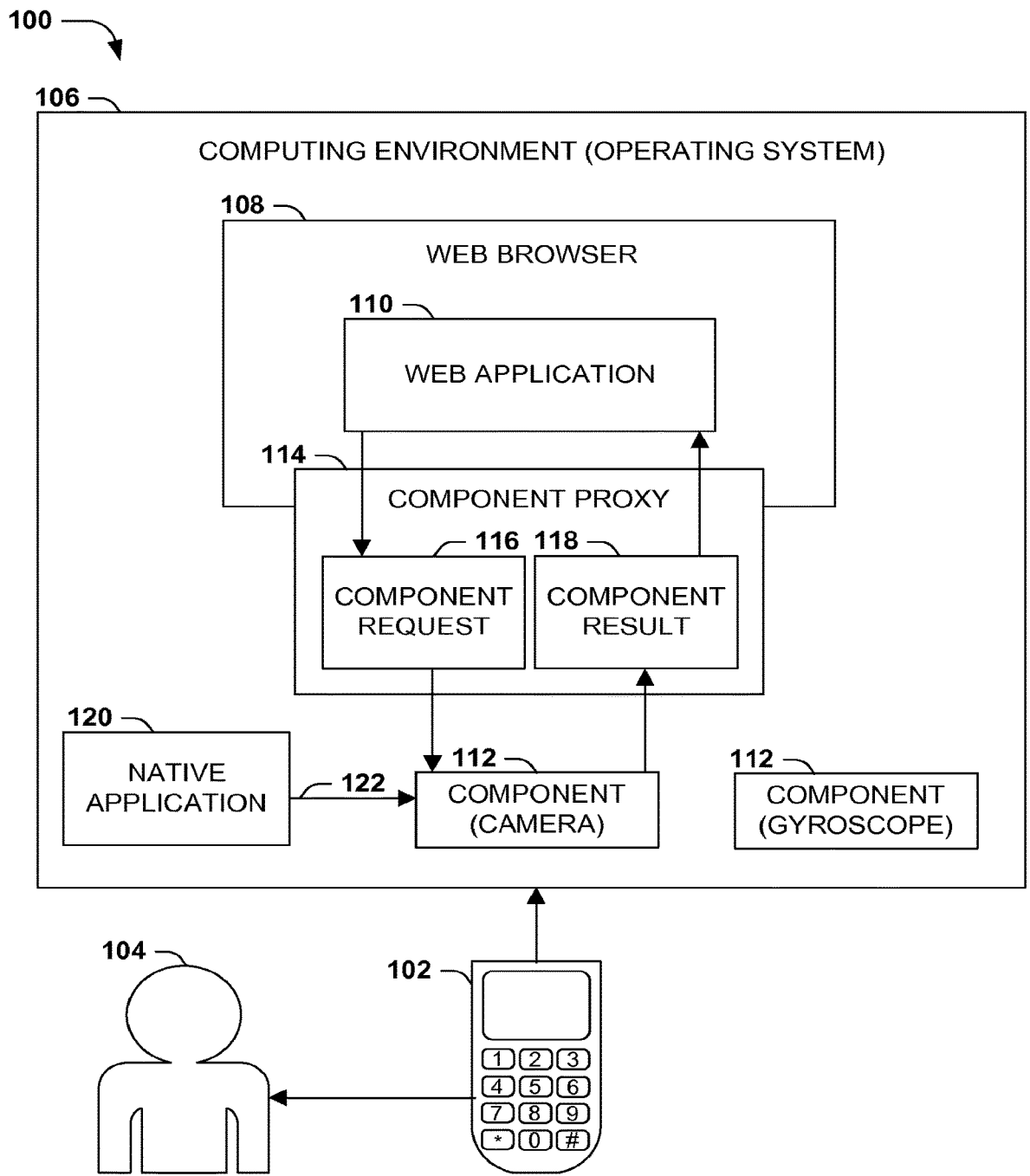
FIG. 1 is an illustration of an exemplary scenario featuring a first model for fulfilling component requests of applications executing within a virtual environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Within the field of computing, many scenarios involve the execution of applications on a device within a virtual environment, rather than within the native computing environment of the device. As a first example, a web browser may provide a standardized platform for executing device-independent code, such as JavaScript and Hypertext Markup Language (HTML) content. As a second example, a Java virtual machine (JVM) may provide a bridge between a generalized computing device and the native capabilities of the device on behalf of a Java application (e.g., translating generalized memory allocation requests to the memory model of the device). As a third example, code designed for the native environment of a first device may be executed on a second, completely device through an emulator that provides a simulation of the first device within the second device. As a fourth example, untrusted code may be executed within a "sandbox" or an artificial machine, such that malicious operations may be isolated to the artificial machine, and the effects of the untrusted code on the artificial device may be evaluated by the device without risk of damage to the device.

These and other scenarios present the execution of an application within a virtual environment. In many such scenarios, in addition to utilizing the resources of the virtual environment, the application may involve interactions with the components of the device. As a first example, the application may interact with a camera of the device, such as a photo editing application that begins with a photo image captured by the camera. As a second example, a location-aware application may request to be notified of the current location of the device, or of an arrival of the device at a particular location, according to a global positioning system (GPS) receiver of the device. As a third example, an augmented reality application may utilize both a camera to capture a current view of the world and a GPS receiver to detect the current location and viewing angle of the device, in order to overlay information on the display of the device that relates to the objects pictured in the image captured by the camera.

It may be appreciated that such scenarios involve capabilities of a device that may not be included by default in the virtual environment. For example, a typical configuration of a web browser does not include any capability for an application to request a photo from a camera or a location detected by a GPS receiver, even if the device includes a camera and/or GPS receiver that feature such capabilities. Where such actions are beyond the default and standardized capabilities of the virtual environment, the device may provide various mechanisms for enabling such applications to initiate such requests on behalf of the components of the device.

FIG. 1 presents an illustration of an exemplary scenario 100 featuring a device 102 operated by a user 104 and configured to execute one or more applications within a computing environment 106, such as an operating system. The applications executing on the device 102 may include both native applications 120 that directly utilize the resources of the computing environment 106, and applications executing within a virtual environment that interact with the resources of the virtual environment, and where the virtual environment fulfills these requests by utilizing the resources of the computing environment 106 on behalf of the hosted applications. In this exemplary scenario 100, the virtual environment comprises a web browser 108 hosting a web application 110. The device 102 may retrieve the web application 110 and initiate execution within the web browser 108.

The device 102 may also comprise one or more hardware components 112, such as a camera and a gyroscope, with which applications request to interact. Native applications 120 executing within the computing environment 106 may initiate interaction 122 directly with the components 112, such as by issuing requests directly to a hardware driver for a component 112. However, web applications 110 executing within a web browser 108 are isolated from direct interaction with the components 112, and instead interact with the resources of the web browser 108. Additionally, the web browser 108 may not be configured to interact with the components 112 on behalf of web applications 110 (e.g., the web browser 108 may have no capability for receiving an image from a camera of a device 102), and thus may be incapable of utilizing the component resources of the device 102 on behalf of the web applications 110. In many scenarios, no alternative interaction model is provided, and the web applications 110 are simply unable to interact with, or even identify, the components 112 of the device.

However, it may be undesirable to constrain the capabilities of the web applications 110 to those comprising the web browser 108. Rather, it may be desirable to enable applications executing within such virtual environments to interact with the components 112 of the device. To this end, various techniques have been devised to enable such accessing.

FIG. 1 illustrates a first such technique, wherein a component proxy 114 is provided that invokes requests on a component 112. For example, a component proxy 114 may accept a component request 116 from the web application 110, interact with the specified component 112, and return a component result 118 to the web application 110. Additionally, the component proxy 114 may scrutinize the component request 116 (e.g., identifying malicious code such as injection attacks) and reject any component requests 116 that may compromise the integrity of the device 102.

However, the model illustrated in the exemplary scenario 100 of FIG. 1 may present some disadvantages. As a first example, the development of a component proxy 114 may add some complexity, such as introducing an additional component into the virtual environment of the web browser 108, and/or providing a different type of interaction with the component 112 that varies from the interaction 122 of native applications 120 with the same component 112. As a second example, in such models, the web application 110 is blocked until the component request 116 is fulfilled (e.g., in order to reduce the exposure of the component 112 to a high volume of component requests 116 as a denial-of-service attack). As a third example, in such models, the component proxy 114 of a first component 112 may differ from the component proxy 114 of a second component 112, or the latter component 112 may simply not provide or interact with any component proxy 114.

Figure 2:
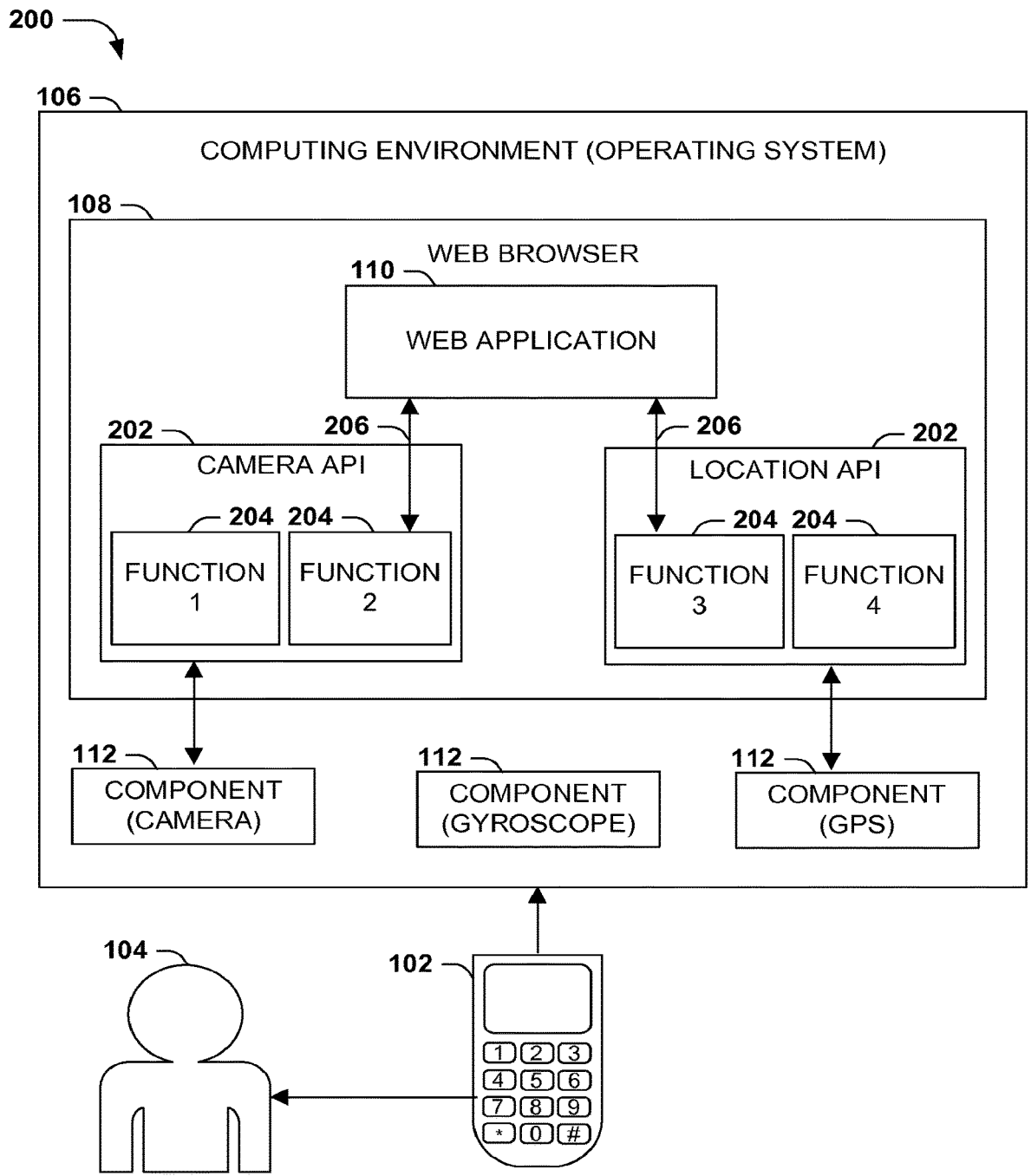
FIG. 2 is an illustration of an exemplary scenario featuring a second model for fulfilling component requests of applications executing within a virtual environment.

FIG. 2 presents an illustration of a second exemplary scenario 200 featuring a device 102 operated by a user 104. This device 102 also features a computing environment 106, within which a web browser 108 is provided to execute one or more web applications 110, and which may utilize respective components 112 of the device 102. In order to enable this interaction, one or more components 112 of the device 102 may insert an interface element into the web browser 108, such as an application programming interface 202 or "plug-in." The application programming interface 202 may enable web applications 110 to initiate one or more invocations 206 of functions 204 within the web browser 108, and may present the invocations 206 to the components 112 outside of the web browser 108, with the results of an invocation 206 returned to the web application 110. This model therefore inserts an interface for one or more components 112 into the web browser 108 in order to enable interactions by web applications 110.

While this model may present some advantages with respect to the component proxy model of FIG. 1, the model presented in this exemplary scenario 200 of FIG. 2 may also exhibit some disadvantages. As a first example, the application programming interfaces 202 for respective components 112 may differ, such that the functions 204 presented by the application programming interface 202 of a first component 112 may differ from the functions 204 presented by the application programming interface 202 of a second component 112 (e.g., the API presented by a camera may use completely different conventions than an API presented by a GPS). A developer seeking to design a web application 110 to use a selected component 112 may first have to learn about the capabilities of its application programming interface 202. Moreover, some components 112 may not include an application programming interface 202, and therefore may not participate or be accessible to web applications 110 executing within the web browser 108.

B. Presented Techniques

When comparing the component proxy model presented in the exemplary scenario 100 of FIG. 1 and the application programming interface (API) plug-in model presented in the exemplary scenario 200 of FIG. 2, it may be appreciated that the disadvantages of these models result from two particular factors. First, in both cases, attempting to import portions of the components 112 of the device 102 into a virtual environment involves a duplication or redevelopment of the functionality of the component 112 (e.g., the component 112 may present the functionality both through a native interface to the native applications 120 executing within the computing environment 106, and through a component proxy 114 or application programming interface 220 to the applications executing within the virtual environment). This redevelopment may be inefficient, and differences may exist or arise between the native interface and the virtual interface for the same component 112 that result in different sets of functionality. Moreover, any components 112 that do not include a virtual environment interface are inaccessible, and perhaps even invisible, within the virtual environment.

Second, because both the component proxy model and the application programming interface (API) plug-in model involve a customized interface provided by each component 112; i.e., each component proxy 114 or application programming interface 202 may be developed in a different manner, using different data standards and interface methodologies. That is, neither model enforces, promotes, or even encourages consistency among the interfaces, and each interface may operate very differently from each other interface. Accordingly, a developer who wishes to invoke the interface for one component 112 may have to study and learn the interface first, even if the developer is familiar with the interfaces for other components 112. Moreover, inconsistencies and incompatibilities among the interfaces may interfere with the interoperation of the components 112. For example, in the device 102 presented in the exemplary scenario 200 of FIG. 2, it may be desirable to combine the functionality of the camera, gyroscope, and GPS receiver to provide an augmented-reality web application 110 executing within the web browser 108; e.g., when the camera captures an image, the web application 110 may detect the location of the device 102 (using the GPS receiver) and the physical orientation of the device 102 (using the gyroscope) to identify the objects within the projected view of the camera while of capturing the image. However, it may be very difficult to design an application that interacts concurrently and performantly with different interfaces (e.g., different component proxies and/or different application programming interfaces 202) for each component 112 within the virtual environment.

Presented herein is a different model for enabling interaction between the components 112 of a device 102 and the applications executing within a virtual environment of the device 102. These techniques present a different model for enabling application/component interactions, involving a service that accepts requests for component interactions from applications executing within a virtual environment, conveys those requests to the components 112 of the device 102, and returns the results to the applications within the virtual environment. The service may fulfill the requests in an asynchronous manner through a callback mechanism; e.g., while initiating the request, the applications within the virtual environment may specify a callback (such as the name or memory address of a function, a script, or a code block such as a lambda expression or abstract syntax tree) to be invoked by the service upon the component 112 completing the request. The service may then fulfill the request outside of the virtual environment, in an asynchronous manner (e.g., reserving processing time and resources to examine the request to satisfy security and access permissions), and upon completion, may invoke the callback with the results of the request generated by the component 112.

Figure 3:
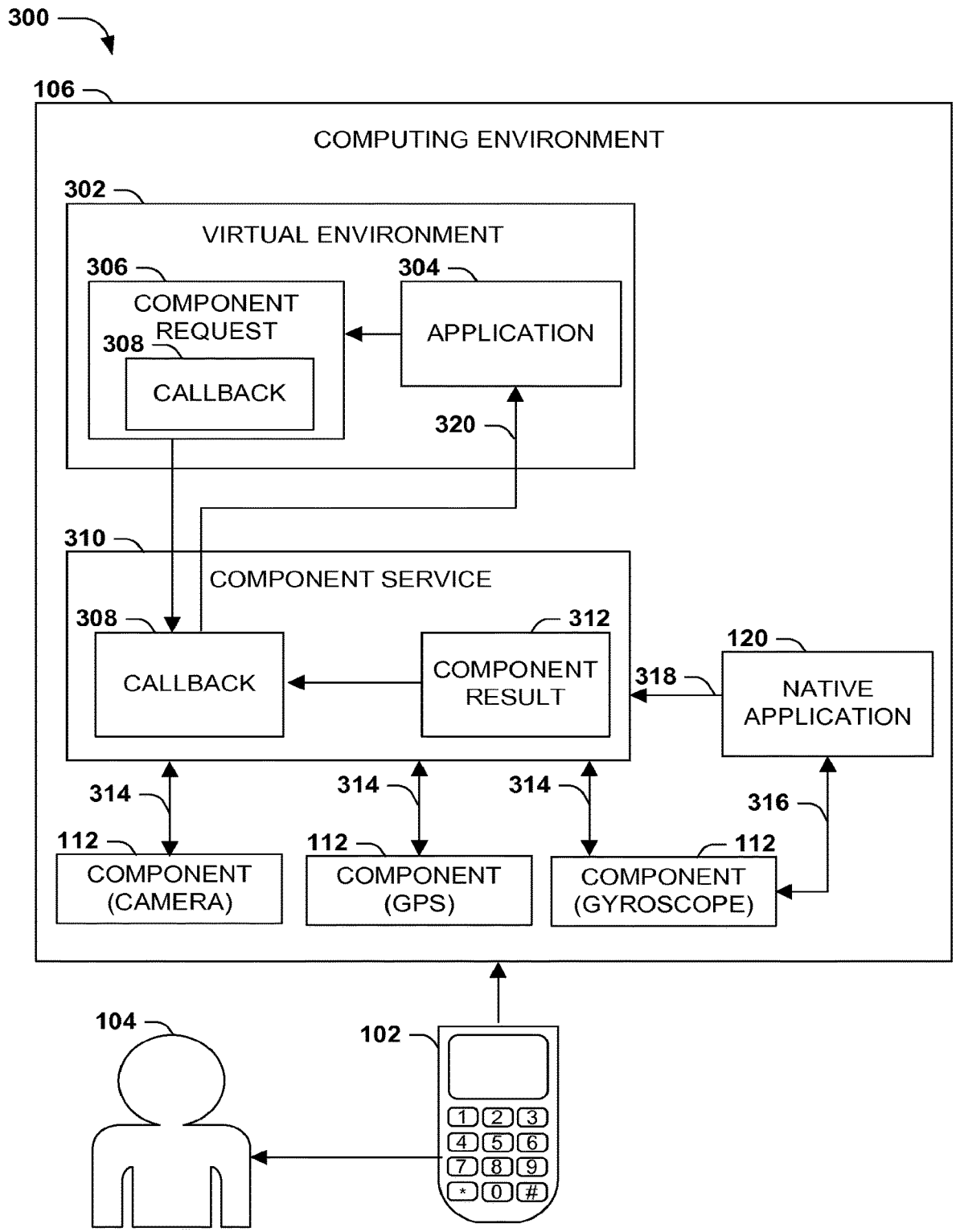
FIG. 3 is an illustration of an exemplary scenario featuring a model for fulfilling component requests of applications executing within a virtual environment in accordance with the techniques presented herein.

FIG. 3 presents an illustration of an exemplary scenario 300 featuring a component service 310 implemented within a computing environment 106 of a device 102 to facilitate interactions among the components 112 of the device 102 and the applications 304 executing with a virtual environment 302 of the device 102. In this exemplary scenario 300, the device 102 of the user 104 includes a set of components 112, each of which may expose some functionality to one or more native applications 120 executing within the computing environment 106. Additionally, the device 102 may include a virtual environment 302 (such as a web browser 108 or a virtual machine) wherein one or more applications 304 may be executed. While the applications 304 primarily interact with the capabilities of the virtual environment 302, the resources of the virtual environment 302 may not feature a mechanism for interacting with components 112 outside of the virtual environment 302. Instead, the device 102 may include a component service 310 that is capable of initiating interactions 314 with each component 112 of the device 102 on behalf of the applications 304 executing within the virtual environment 302. For example, an application 304 may initiate a component request 306 for an invocation 314 of a component 112 of the device 102 (e.g., a capturing of an image by the camera; a geopositioning of the device 102 by the GPS receiver; or a detection of a physical orientation of the device 102 by the gyroscope). Although the application 304 cannot directly send the component request 306 to the component 112, the application 304 may submit the component request 306 to the component service 310, which may communicate with the component 112 on behalf of the application 304.

As further illustrated in the exemplary scenario 300 of FIG. 3, the application 304 may specify with the component request 306 a callback 308, such as the name or memory address of a function, a script, or a code block such as a lambda expression or abstract syntax tree, to be invoked upon completion of the invocation 314. The component service 310 may accept the component request 306 and store the callback 308, and upon receiving from the component 112 a completion of the invocation 314, may invoke the callback 308 on behalf of the application 304. If the invocation 314 of the component 112 generated a component result 312 (e.g., an image from the camera, a set of latitude/longitude/altitude coordinates from the GPS receiver, or detected orientation metrics from the gyroscope), the component service 310 may receive the component result 312 and provide it to the callback 308. The component service 310 may also notify 320 the application 304 within the virtual environment 302 of the completion of the invocation 314, the invocation of the callback 308, and/or the receipt of the component result 312. In this manner, the component service 310 may fulfill the component request 306 of the application 304 specifying a component 112 of the device 102.

The component access model presented in the exemplary scenario 300 of FIG. 3 may present several advantages, particularly when compared with the component proxy model illustrated in the exemplary scenario 100 of FIG. 1 and the application programming interface model illustrated in the exemplary scenario 200 of FIG. 2. As a first example, the component service 310 may present a model for interacting with any component 112 of the device 102, irrespective of the functionality provided by each component 112, and therefore may provide a consistent and standardized interface. As a second example, by initiating interactions 314 with respective components 112 in the same manner as native applications 120, the component service 310 may reduce the redundant and inefficient implementation by the component 112 of a second interface for the virtual environment 302. As a third example, by interacting with the applications outside of the virtual environment 302, the component service 310 may be ascribed the same privileges as native applications 120 executing within the computing environment 106. Accordingly, the same set of functionality of the components 112 may be provided to the applications 304 executing within the virtual environment 302 as provided to native applications 120 executing within the computing environment 302. Conversely, in addition to interacting 316 directly with the components 112, native applications 12 may be designed to interact 318 with the components 112 through the component service 310 in the same manner as the applications 304 executing within the virtual environment 302. As a fourth example, by communicating completion of invocations 314 with the applications 304 within the virtual environment 302 via callbacks 308, the component service 310 may promote the asynchronous fulfillment of component requests 306, without the applications 304 having to implement a separate interaction thread or other asynchronous mechanism. These and other advantages may be achievable through the implementation of the component service 310 according to the techniques presented herein.

C. Exemplary Embodiments

Figure 4:
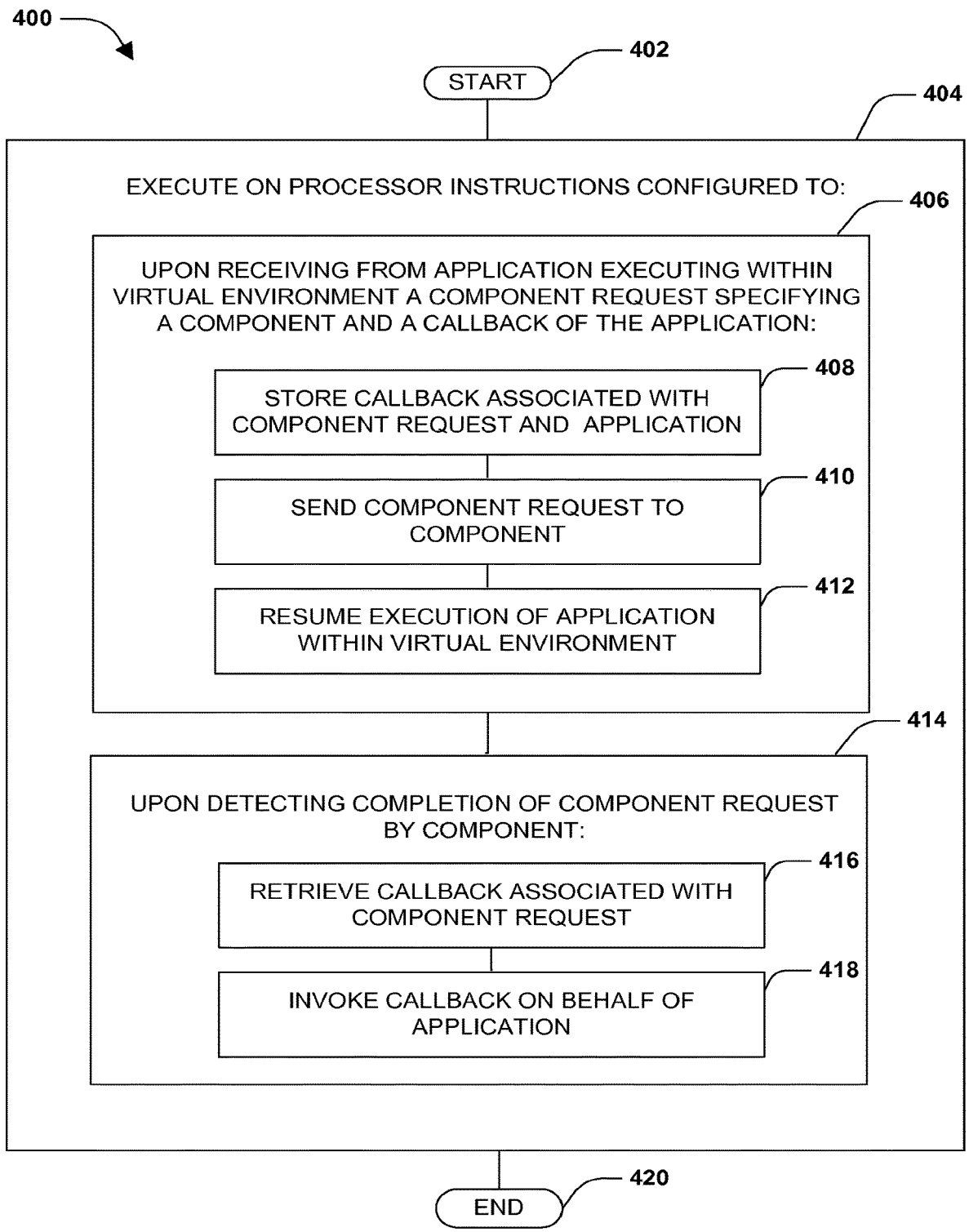
FIG. 4 is a flow diagram of an exemplary method of fulfilling component requests of applications executing within a virtual environment in accordance with the techniques presented herein.

FIG. 4 presents a first exemplary embodiment of the techniques presented herein, illustrated as an exemplary method 400 of fulfilling component requests 306 received from applications 304 executing within a virtual environment 302. The exemplary method 400 may be implemented, e.g., as a set of instructions stored in a memory device of the device 102, such as a memory circuit, a platter of a hard disk drive, a solid-state storage device, or a magnetic or optical disc, and organized such that, when executed on a processor of the device, cause the device 102 to operate according to the techniques presented herein. The exemplary method 400 begins at 402 and involves executing 404 the instructions on a processor of the device 102. Specifically, these instructions may be configured to, upon receiving 406 from an application 304 executing within the virtual environment 302 a component request 306 specifying a component 112 of the device 102 and a callback 308 of the application 304, store 408 the callback 308 associated with the component request 306 and the application 304; send 410 the component request 306 to the component 112; and resume 412 execution of the application 304 within the virtual environment 302. The instructions may also be configured to, upon detecting 414 a completion of the component request 306 by the component 112, retrieve 416 the callback 308 associated with the component request 306, and invoke 418 the callback 308 on behalf of the application 304. Having achieved the fulfillment of the component request 306 of the component 112 on behalf of the application 304, the exemplary method 400 applies the techniques presented herein to the scenario illustrated in the exemplary scenario 300 of FIG. 3, and so ends at 420.

Figure 5:
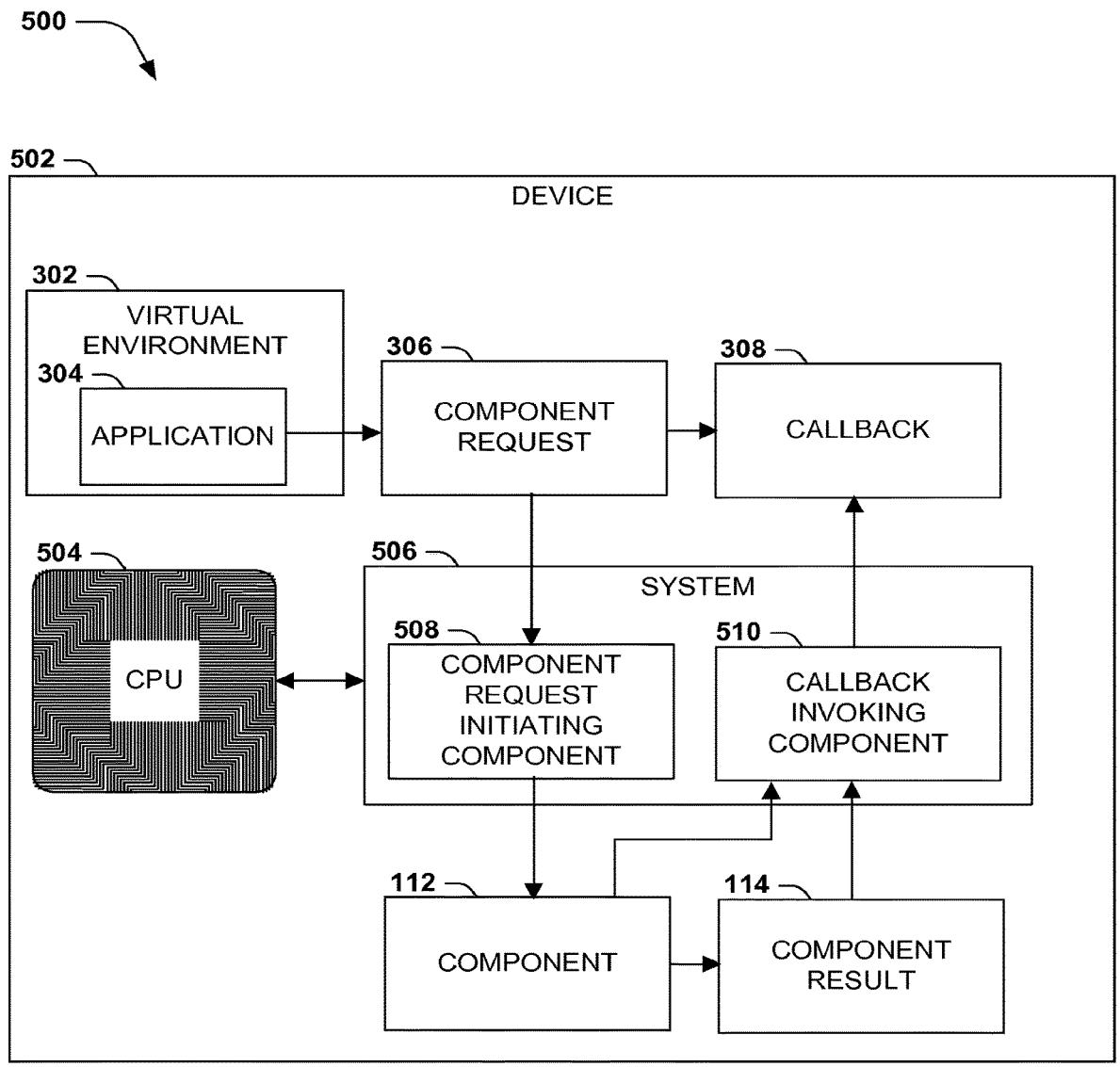
FIG. 5 is a component block diagram of an exemplary system configured to fulfill component requests of applications executing within a virtual environment in accordance with the techniques presented herein.

FIG. 5 presents a second exemplary embodiment of the techniques presented herein, illustrated as an exemplary system 506 configured to fulfill component requests 306 on behalf of applications 304 executing with a virtual environment 302 of a device 502 having a processor 504. The exemplary system 506 may be implemented, e.g., as instructions stored in a memory component of the device 502 and configured to, when executed on the processor 504 of the device 502, cause the device 502 to operate according to the techniques presented herein. The exemplary system 506 comprises a component request initiating component 508, which is configured to, upon receiving from an application 304 executing within the virtual environment 302 a component request 306 specifying a component 112 and a callback 308 of the application 304, store the callback 308 associated with the component request 306 and the application 304; send the component request 306 to the component 112; and resume execution of the application 304 within the virtual environment 302. The exemplary system 506 also comprises a callback invoking component 501, which is configured to, upon detecting a completion of the component request 306 by the component 112, retrieve the callback 308 associated with the component request 306, and invoke the callback 308 on behalf of the application 304. The interoperation of these components of the exemplary system 506 may enable the device 502 to fulfill component request 306 received from applications 304 executing within the virtual environment 302 on behalf of the techniques presented herein.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 6:
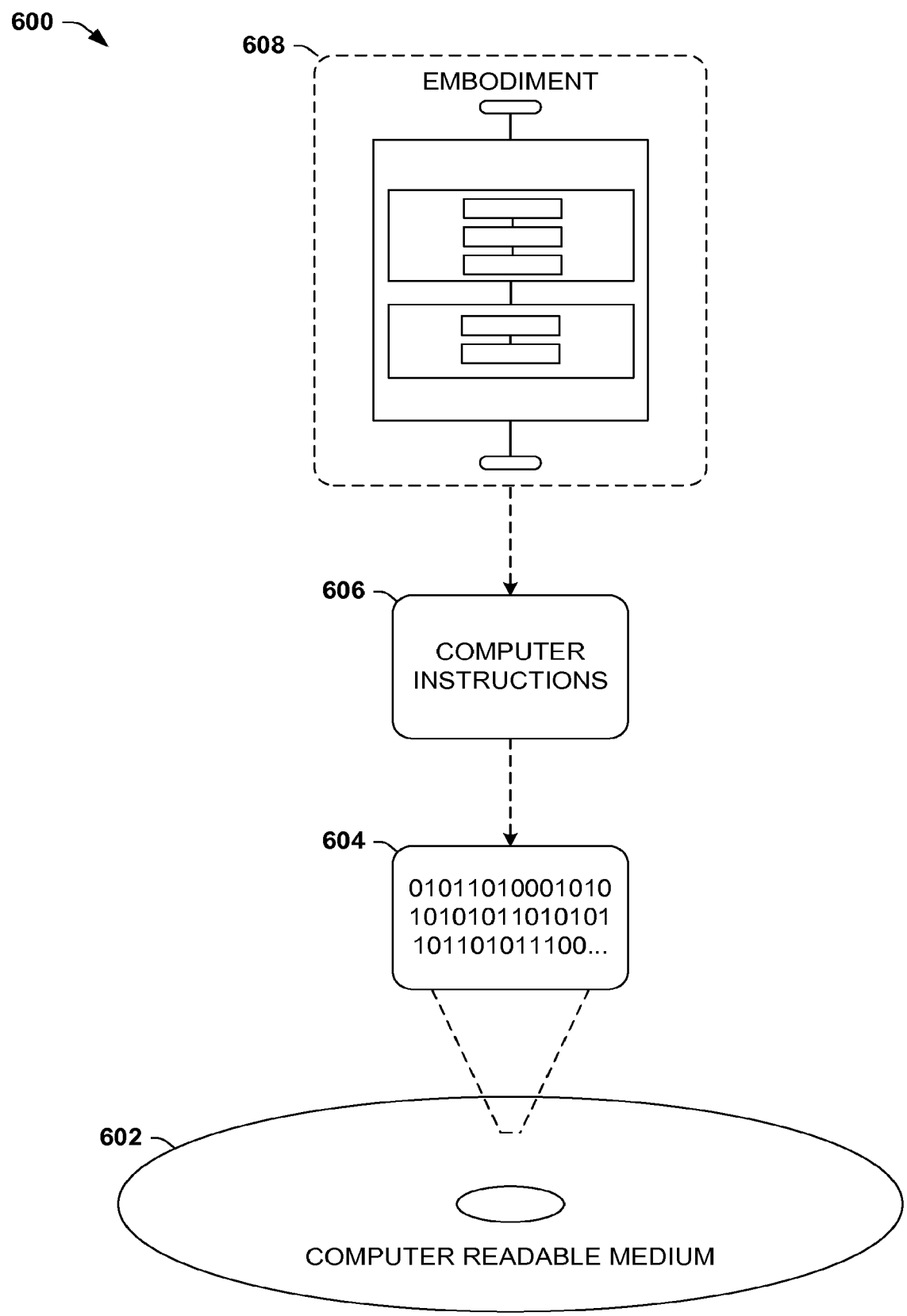
FIG. 6 is an illustration of an exemplary computer-readable medium comprising processor-executable instructions configured to embody one or more of the provisions set forth herein.

An exemplary computer-readable medium that may be devised in these ways is illustrated in FIG. 6, wherein the implementation 600 comprises a computer-readable medium 602 (e.g., a CD-R, DVD-R, or a platter of a hard disk drive), on which is encoded computer-readable data 604. This computer-readable data 604 in turn comprises a set of computer instructions 606 configured to operate according to the principles set forth herein. In one such embodiment, the processor-executable instructions 606 may be configured to perform a method 608 of fulfilling component requests 306 on behalf of applications executing within a virtual environment 302, such as the exemplary method 400 of FIG. 4. In another such embodiment, the processor-executable instructions 606 may be configured to implement a system for fulfilling component requests 306 on behalf of applications executing within a virtual environment 302, such as the exemplary system 506 of FIG. 5. Some embodiments of this computer-readable medium may comprise a computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 400 of FIG. 4 and the exemplary system 506 of FIG. 5) to confer individual and/or synergistic advantages upon such embodiments.

D1. Scenarios

A first aspect that may vary among embodiments of these techniques relates to the scenarios wherein such techniques may be utilized.

As a first variation of this first aspect, the techniques presented herein may be utilized with many types of devices 502, such as servers, server farms, workstations, laptops, tablets, mobile phones, game consoles, and network appliances.

As a second variation of this first aspect, the techniques presented herein may be utilized to service applications 304 executing within many types of virtual environments 302, such as a web browser, a simulated and/or emulated virtual machine, a middleware platform, and/or an isolation construct.

As a third variation of this first aspect, the techniques presented herein may be utilized to service many types of applications 304, such as web applications written in various interpreted and/or compiled languages, file-sharing applications, media rendering applications, and data-driven client applications.

As a fourth variation of this first aspect, the techniques presented herein may involve many types of components 112, such as human input devices (e.g., keyboard, mice, voice microphones, speech processors, gaze locators, and natural gesture interfaces); sensors (e.g., GPS receivers, gyroscopes, compasses, and light level detectors); communications devices (e.g., wired network adapters, local area network (LAN) wireless adapters, and/or cellular wireless adapters); output devices (e.g., monitors, audio speakers, printers, and tactile feedback generators); and device controllers and/or device interfaces (e.g., machine control systems). The components 112 may also include various software components, such as file systems, data stores, platforms, application programming interfaces (APIs), and objects.

As a fifth variation of this first aspect, the component service 310 may interact with the components 112 of the device 102 in various ways. As a first such example, the component service 310 may provide a "pluggable" framework, and the components 112 may provide drivers or other interfaces to enable interactions with the component service 310. As a second such example, the component service 310 may proactively discover the components 112 of the device 102, e.g., by querying a device manager, device stage, system registry, or configuration manifest of the device 102 to determine the components 112 of the device 102 and the capabilities of each component 112.

As a sixth variation of this first aspect, the techniques presented herein may involve many types of component requests 306 directed to such components 112 involving many types of functionality, such as capturing input from one or more sensors; reading data from a storage device;

writing data to a storage device; performing a set of computation; or adjusting a property of the component 112. Moreover, such component requests 306 many involve many types of callbacks 308, such as the name or memory address of a function of the application 304 or of an application programming interface (API) method of the computing environment 106; a script; or a code block such as a lambda expression or abstract syntax tree. These and other scenarios may be compatible with and may advantageously utilize the techniques presented herein.

D2. Component Service

A second aspect that may vary among embodiments of these techniques involves the implementation of the component service 310. While the component service 310 may be configured in accordance with the exemplary method 400 of FIG. 4 and/or as the exemplary system 506 of FIG. 5, it may be appreciated that many design details may be selected for such implementations, and that some such designs may present comparative advantages and/or reduce disadvantages with respect to other designs.

Figure 7:
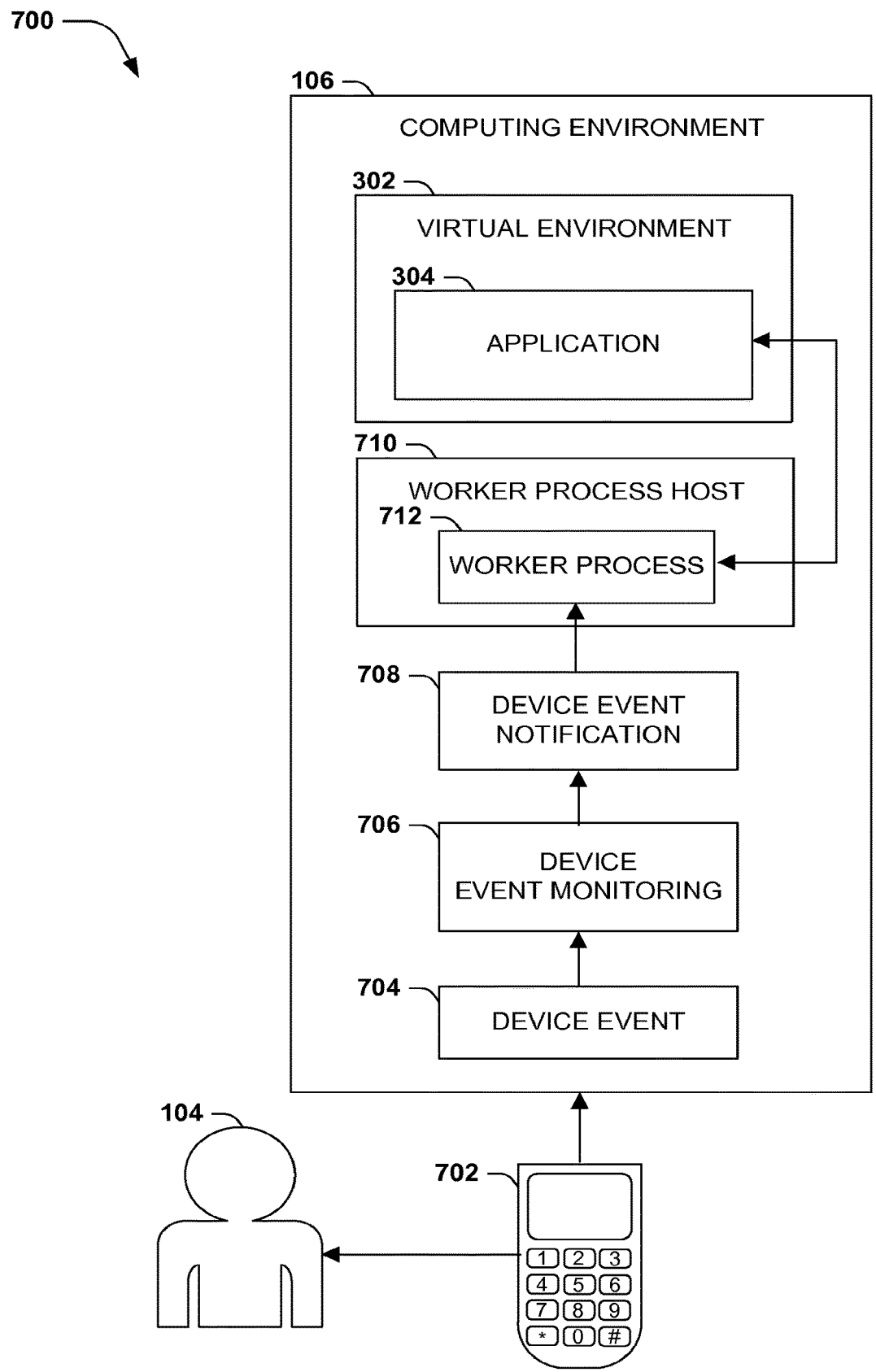
FIG. 7 is an illustration of an exemplary scenario featuring a first implementation of the component service within the computing environment in accordance with the techniques presented herein.

FIG. 7 presents an exemplary scenario 700 featuring a first exemplary embodiment of a component service 310 implemented on a device 702 as a worker process host 710 that is configured to host worker processes 712, executing on behalf of respective applications 304 and outside of the virtual environment 302. In this exemplary scenario 700, the worker process host 710 may, upon receiving a component request 306 from an application 304 within the virtual environment 302, initiate a worker process 712 outside of the virtual environment 302. This worker process 712 may be configured to send the component request 306 to the component 112. The instructions comprising the worker process 712 may be provided by the application 304, the virtual environment 302, the worker process host 710, the component 112, and/or the device 702. Upon detection a completion of the component request 306 by the component 112, the worker host process 710 may notify the worker process 712 (as one technique for invoking the callback specified by the application 304 with the component request 306), which, in turn, may perform processing on a component result 312 of the component request 306 and/or notify the application 304 of the completion of the component request 306. For example, and as illustrated in the exemplary scenario 700 of FIG. 7, the component request 306 may specify a monitoring of device events 704 involving a particular component 112 (e.g., monitoring a camera component to detect the capturing of an image). The device 702 may provide a device monitoring service 706 that monitors such device events 704 and, upon detecting a monitored device event 704, generates a device event notification 708 for the worker process host 710. The worker process host 710 may in turn confer the device event notification 708 to the worker process 712 (optionally initiating the worker process 712 if it is not already executing on behalf of the application 304), which may process the component request 306 and/or notify the application 304 of the device event 704. In this manner, the component service 310 may be implemented as a worker process host 710 to enables execution of callbacks 308 on behalf of the applications 304 in response to the completion of component requests 306.

Figure 8:
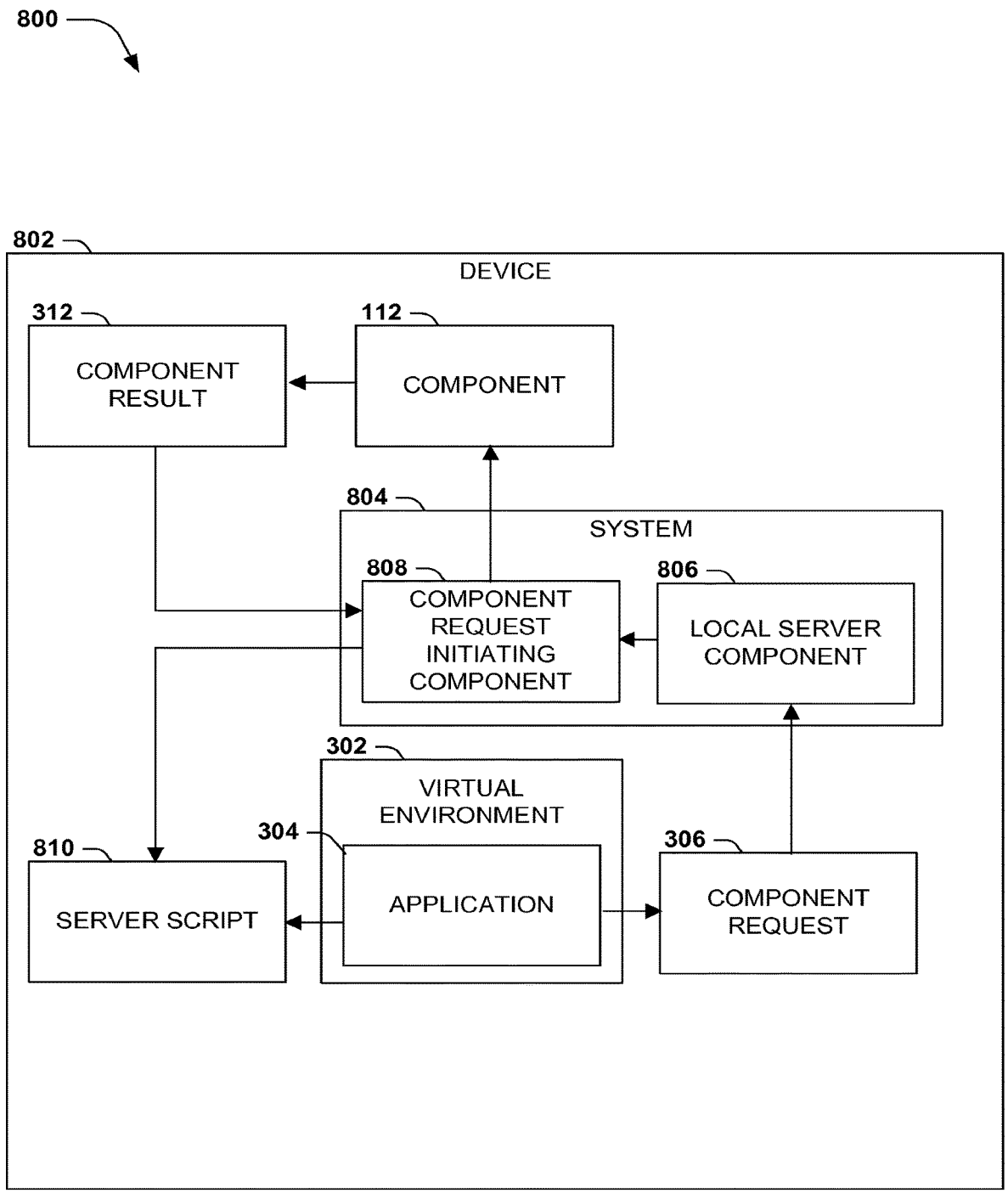
FIG. 8 is an illustration of an exemplary scenario featuring a second implementation of the component service within the computing environment in accordance with the techniques presented herein.

FIG. 8 presents an exemplary scenario 800 featuring a second exemplary embodiment of the techniques presented herein. In this exemplary scenario 800, a device 802 featuring a processor 504 fulfills component requests 306 on behalf of applications 304 executing within a virtual environment 302 by providing a local server component 806 that executes outside of the virtual environment 302 and that fulfills component requests 306 on behalf of applications 304 executing within the virtual environment 302. For example, where the virtual environment 302 comprises a web browser and the application 304 comprises a web application, the component service 310 may comprise a system 804 featuring a locally deployed webserver, which may associate various components 116 and/or component requests 306 with a particular address, such as a uniform resource identifier (URI), that is mapped within the domain of the local webserver (e.g. "http://localhost/dev1-camera" to identify a camera component, and/or "http://localhost/dev1-camera" to identify a URI accessed to request a capturing of a photo from the camera). When the local server component 806 receives a component request 306 (e.g., a URI) from an application 304 executing within the web browser, the system 804 may invoke a component request initiating component 808 to initiate an interaction with the component 112. Additionally, upon detecting a completion of the component request 306 by the component 112, the local server component 806 may invoke a server script 810 on behalf of the application 304 to evaluate a component result 312 of the component request 306 and/or to notify the application 304 of the completion of the component request 306. In this manner, the component service 310 may be implemented through a local server model in order to interact with the components 112 on behalf of the applications 304 executing within the virtual environment 302. Many such implementations may be devised by those of ordinary skill in the art while implementing the techniques presented herein.

D3. Component Service Features

A third aspect that may vary among embodiments of these techniques relates to various features that may be implemented in the component service 310.

As a first variation of this third aspect, the component service 310 may interact with the applications 304 and/or the virtual environment 302 in various ways. As a first such example, the component service 310 may present an interface within the virtual environment 302, and may enable the applications 304 to interact with the component service interface to initiate component requests 306. As a second such example, the component service 310 may not be present within the virtual environment 302, but may detect the initiation of component requests 306 within the virtual environment 302 and may receive or intercept such component requests 306 to be fulfilled on behalf of the applications 304. As a third such example, the component service 310 may be integrated with the virtual environment 302, and may be exposed, e.g., as an aspect of the virtual machine presented by the virtual environment 302 to the applications 304.

As a second variation of this third aspect, the component service 310 may assist the applications 304 within the virtual environment 302 in discovering the components 112 of the device 102 and the capabilities available therethrough. For example, the component service 310 may, upon receiving from an application 304 within the virtual environment 302 a component enumeration request, the component service 310 may enumerate for the application 304 the components 112 of the device 102 that are identifiable in a component request. Alternatively or additionally, upon receiving from an application 304 within the virtual environment 302 a device capability enumeration request, the component service 310 may enumerate for the application 304 the component capabilities of respective components 112 of the device 102 (e.g., the capability of capturing an image; the capability of detecting a location; and the capability of detecting a physical orientation of the device 102). That is, the capabilities of the components 112 may be presented to the application 304 without necessarily identifying the components 112 through which such capabilities are achievable. Moreover, upon receiving from the application 304 within the virtual environment 302 a device capability request specifying a component capability (e.g., "please detect the physical orientation of the device") rather than a specific component 112, the component service 310 may translate the device capability request into a component request specifying a component 112 having the component capability specified by the device capability request (e.g., translating the physical orientation request into a request for an invocation of a function of a gyroscope components that generates the requested information).

As a third variation of this third aspect, a device 102 may provide various security mechanisms applicable to interactions between the component service 310 and the components 112 on behalf of the applications 304. Such security mechanisms may be desirable, e.g., where the applications 304 may comprise untrusted code, such as web applications casually retrieved from various websites, or mobile agents received from untrusted users. The virtual environment 302 itself may comprise an isolation construct, such as a virtual machine that an untrusted application 304 may disrupt without interfering with the operation of the computing environment 106 of the device 102. In such scenarios, enabling the applications 304 to initiate component requests 306 with the components 112 through the component service 310 may represent a security vulnerability, which may be mitigated through various security measures. As a first such example, if the application 304 is ascribed a particular trust level and/or permissions set, the component service 310 and/or component requests 306 may be ascribed the same trust level and/or permissions set in order to avoid escalating the privileges of the application 304. As a second such example, the component service 310 may scrutinize the component requests 306 and/or component results 312 for security issues, e.g., the inclusion of malicious code or an accessing or leakage of private user information. As a third such example, the component service 310 may involve the user 104 in trust decisions; e.g., where the component request 306 specifies a component capability of the component 112, the component service 310 may present to the user 104 an offer to initiate the component request 306 identifying the component capabilities requested by the application 304 (e.g., "This application is requesting access to the gyroscopic sensor"), and may initiate the component request 306 only after receiving an acceptance of the offer from the user 104.

As a fourth variation of this third aspect, after a component 112 completes a component request 306, the component service 310 may fulfill the component request 306 on behalf of the application 304 in various ways. As a first such example, the callback 308 associated with the component request 306 may be invoked by the component service 310 within the virtual environment 302 (e.g., client-side Javascript executed within the web browser); outside of the virtual environment 302 (e.g., native instructions executing within the computing environment 106); and/or within another virtual machine (e.g., as server-side Javascript utilizing the Node.js server-side Javascript module and executed by a web browser).

Figure 9:
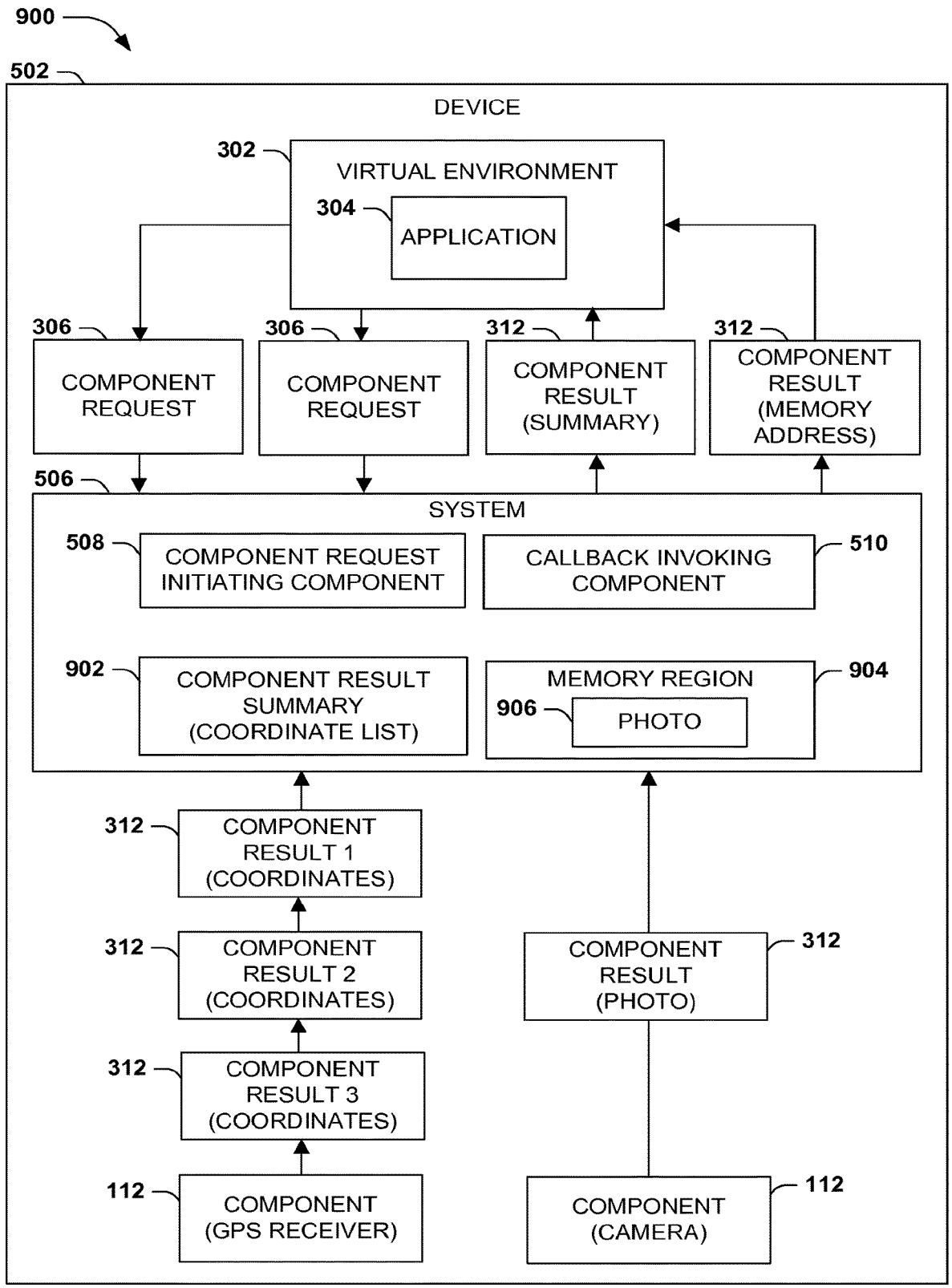
FIG. 9 is an illustration of an exemplary scenario featuring two techniques for fulfilling component requests resulting in a component result in accordance with the techniques presented herein.

As a second example of this fourth variation of this third aspect, if the component request 306 to the component 112 results in a component result 312, the component service 310 may convey the component result 312 to the callback 308 and/or the application 304 in various ways. FIG. 9 presents an exemplary scenario 900 featuring two variations in the conveyance of the component result 312 to the application 304. In this exemplary scenario 900, a device 502 provides an application 304 executing within a virtual environment 302, and a set of components 112 to which the application 304 directs component requests 306. For example, the device 502 may comprise a GPS receiver component capable of detecting latitude and longitude coordinates, and a camera component capable of capturing a photo 906. The device 502 may include a variant of the exemplary system 506 illustrated in FIG. 5 to provide a component service 310 to the application 304, e.g., a component request initiating component 508 configured to initiate interactions with the components 112 on behalf of the application 304, and a callback invoking component 510 configured to invoke a callback 308 specified by the application 304 in the component request 306. Moreover, the component service 310 may handle the component results 312 of the components 112 in various ways. As a first such example, the GPS receiver component may comprise an overly verbose or "chatty" set of component results 312, such as a frequent stream of coordinates. However, the application 304 may only occasionally utilize the coordinates (and perhaps only once), and invoking the callback 308 for each component result 312 may be undesirable. Instead, the component service 310 may generate a condensed component result having a smaller size than the uncondensed component result 312, such as an aggregated set of coordinates reported by the GPS receiver over an extended period. Alternatively or additionally, the application 304 may specify a requested result type (e.g., the type of data from the component 112 that is useful to the application 304), and the condensed component result may exclude at least one portion of at least one component result 312 that is not related to the requested result types identified by the application 304 (e.g., if a GPS receiver reports thirty coordinates per minute and the application 304 only utilizes one coordinate per minute, the component service 310 may exclude 29 of the coordinates received per minute). In some such scenarios, the condensing may be user-selectable; e.g., the user 104 may a condensing preference for the data reported to the application 304 (e.g., providing some personal information and withholding other personal information), and the component service 310 may generate the condensed component results according to the condensing preferences of the user 104.

Another variation illustrated in the exemplary scenario 900 of FIG. 9 involves the use of a memory buffer to present a component result 312 to the application 304 and/or callback 308. For example, in some scenarios, the device service 301 may directly return the data generated by a component 112 to the application 304 or callback 308, but in other scenarios, this may be undesirable (e.g., where the data is voluminous). Therefore, the component service 310 may store the component result 312 in a memory region 904 that is accessible to the application 304 and/or callback 308 (e.g., a block of memory where a photo 906 generated by a camera may be stored), and may simply notify the application 304 and/or the callback 308 of the memory address of the memory region 904 so that the application 304 and/or callback 308 may access the component result 312 if so desired.

As a fifth variation of this third aspect, the component service 310 may communicate with the applications 304 and/or callbacks 308 through many communications mechanisms. As one such example, the component service 310 may intermittently communicate with the applications 304 and/or callbacks 308, or may maintain a communication channel throughout the life of the component request 306. For example, in the exemplary scenario 800 of FIG. 8, the local server component 806 may be configured to receive the component requests 306 during a communication session initiated by the application 304 executing within the virtual environment 302 (e.g., a hypertext transport protocol (HTTP) session initiated with the webserver); may maintain the communication session until the completion of the component request 306; and may notify the application 304 of the completion of the component request 306 via the communication session before terminating the communication session with the application 304. Moreover, the application 304 may be permitted to query the server for status updates regarding the component request 306, to deliver requests to abort the component request 306, etc.

As a sixth variation of this third aspect, in addition to servicing the applications 304 executing within the virtual environment 302, the component service 310 may initiate interactions with the components 112 of the device 102 on behalf of other processes. As a first such example, a component service 310 may, upon receiving a component request 306 from an application 304 executing outside of the virtual environment 302 on the device 102, store the callback 308 associated with the component request 306 and the application 304, and send the component request 306 to the component 112 on behalf of the application 304. (For example, as illustrated in the exemplary scenario 300 of FIG. 3, rather than interacting 316 directly with the components 112, a native application 120 may opt to interact 318 with the components 112 through the component service 310, and the component service 310 may accept and process such component requests 306 equivalently to those initiated by applications 304 executing within the virtual environment 302).

As a second example of this sixth variation of this third aspect, the component service 310 may also invoke component requests 306 for the components 112 of the device 102 on behalf of remote processes. For example, upon receiving a component request 306 from a remote process executing on a second device, the component service 310 may store the callback 308 associated with the component request 306 and the remote application, and send the component request 306 to the component 112; and upon detecting a completion of a component request 306 associated with a remote process, the component service 310 may invoke the callback 308 on behalf of the remote application. Moreover, the callback 308 of the remote application may be invoked within the virtual environment 302 (e.g., as a sandbox isolation construct). Alternatively or additionally, the remote application may invoke the component request 306 on behalf of the application 304 executing within the virtual environment 302; i.e., rather than submitting the component request 306 directly to the component service 310, the application 304 may interact with a cloud service on a remote server, and the cloud service may contact the component service 310 to initiate the component request 306 on behalf of the application 304 executing within the virtual environment 302. In some such scenarios, the component service 310 may only accept and process requests on behalf of trusted remote processes. For example, the application 304 may comprise at least one credential (e.g., a username and password), and the component request 306 received from the remote process including at least one credential authenticating the component request 306 on behalf of the application 304; and the component service 310 may, before sending the component request 306 to the component 112, authenticate the credential of the component request 306. Those of ordinary skill in the art may include many such features in implementations of the techniques provided herein.

E. Computing Environment

Figure 10:
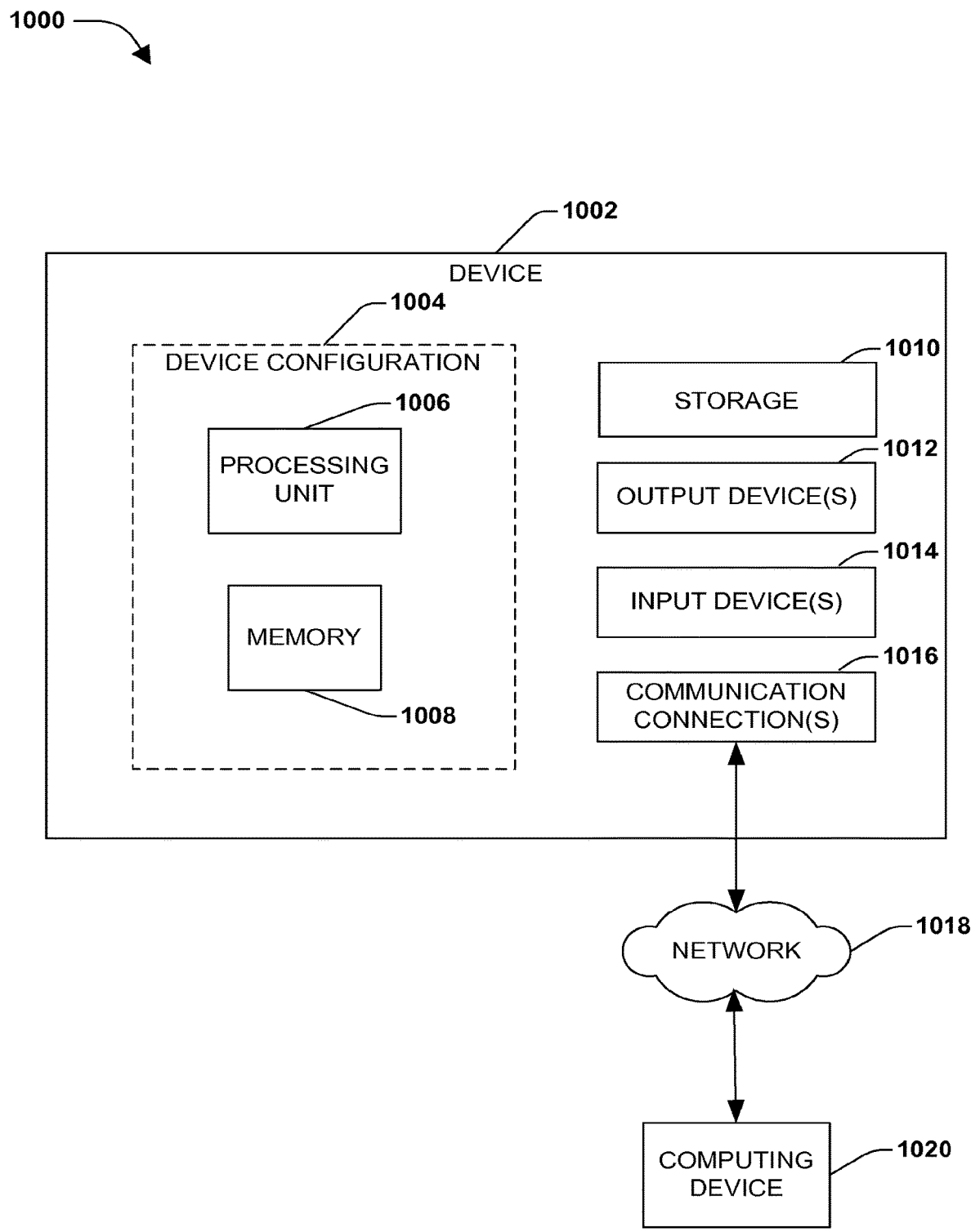
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1000 comprising a computing device 1002 configured to implement one or more embodiments provided herein. In one configuration, computing device 1002 includes at least one processing unit 1006 and memory 1008. Depending on the exact configuration and type of computing device, memory 1008 may be volatile (such as RAM, for example), non-volatile (such as ROM, flash memory, etc., for example) or some combination of the two. This configuration is illustrated in FIG. 10 by dashed line 1004.

In other embodiments, device 1002 may include additional features and/or functionality. For example, device 1002 may also include additional storage (e.g., removable and/or non-removable) including, but not limited to, magnetic storage, optical storage, and the like. Such additional storage is illustrated in FIG. 10 by storage 1010. In one embodiment, computer readable instructions to implement one or more embodiments provided herein may be in storage 1010. Storage 1010 may also store other computer readable instructions to implement an operating system, an application program, and the like. Computer readable instructions may be loaded in memory 1008 for execution by processing unit 1006, for example.

The term "computer readable media" as used herein includes computer storage media. Computer storage media includes volatile and nonvolatile, removable and non-removable media implemented in any method or technology for storage of information such as computer readable instructions or other data. Memory 1008 and storage 1010 are examples of computer storage media. Computer storage media includes, but is not limited to, RAM, ROM, EEPROM, flash memory or other memory technology, CD- ROM, Digital Versatile Disks (DVDs) or other optical storage, magnetic cassettes, magnetic tape, magnetic disk storage or other magnetic storage devices, or any other medium which can be used to store the desired information and which can be accessed by device 1002. Any such computer storage media may be part of device 1002.

Device 1002 may also include communication connection(s) 1016 that allows device 1002 to communicate with other devices. Communication connection(s) 1016 may include, but is not limited to, a modem, a Network Interface Card (NIC), an integrated network interface, a radio frequency transmitter/receiver, an infrared port, a USB connection, or other interfaces for connecting computing device 1002 to other computing devices. Communication connection(s) 1016 may include a wired connection or a wireless connection. Communication connection(s) 1016 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1002 may include input device(s) 1014 such as keyboard, mouse, pen, voice input device, touch input device, infrared cameras, video input devices, and/or any other input device. Output device(s) 1012 such as one or more displays, speakers, printers, and/or any other output device may also be included in device 1002. Input device(s) 1014 and output device(s) 1012 may be connected to device 1002 via a wired connection, wireless connection, or any combination thereof. In one embodiment, an input device or an output device from another computing device may be used as input device(s) 1014 or output device(s) 1012 for computing device 1002.

Components of computing device 1002 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 1002 may be interconnected by a network. For example, memory 1008 may be comprised of multiple physical memory units located in different physical locations interconnected by a network.

Those skilled in the art will realize that storage devices utilized to store computer readable instructions may be distributed across a network. For example, a computing device 1020 accessible via network 1018 may store computer readable instructions to implement one or more embodiments provided herein. Computing device 1002 may access computing device 1020 and download a part or all of the computer readable instructions for execution. Alternatively, computing device 1002 may download pieces of the computer readable instructions, as needed, or some instructions may be executed at computing device 1002 and some at computing device 1020.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A system configured to fulfill component requests received from applications within a virtual environment executing on a device having at least two hardware components that each have an associated capability, the system comprising:
    a component request initiating component configured to,
        upon receiving from an application executing within the virtual environment a component request specifying a callback of the application and a one of the hardware components the capability of which is to be invoked,
        store the callback associated with the component request and the application,
        send the component request to the one hardware component for completion, and
        resume execution of the application within the virtual environment;
    a callback invoking component configured to, upon detecting a completion of the component request that yields at least one component result, retrieve the callback associated with the component request; and
    a component service that is configured to scrutinize
        the component request and
        one or more of the at least one component result
    for at least one of
        inclusion of malicious code and
        an accessing or leakage of private user information.

2. The system of claim 1, wherein:
    respective components of the device are identified by a request address; and
    the component request initiating component comprises a server configured to receive component requests specifying a request address identifying the one hardware component of the received component request.

3. The system of claim 2, wherein:
    the server is configured to receive the component requests during a communication session initiated by the application executing within the virtual environment; and
    the callback invoking component is further configured to:
        until the completion of the component request, maintain the communication session with the application; and
        upon detecting the completion of the component request, notify the application of the completion of the component request via the communication session.

4. The system of claim 3, wherein:
    the server comprises a hypertext transport protocol (HTTP) server;
    the communication session comprises a hypertext transport protocol (HTTP) session; and
    the request address comprises a uniform resource locator (URL) identifying the component.

5. The system of claim 1, wherein:
    the system further comprises, for respective components, a component model of the component presented within the virtual environment;
    the component request initiating component is configured to receive the component request from the application as a component model request initiated by the application and specifying the component model within the virtual environment; and
    the system further comprises a callback invoking component configured to, upon detecting the completion of the component request by the one hardware component, notify the application of the completion of the component request through the component model within the virtual environment.

6. The system of claim 1, wherein:
    the completion of the component request comprises at least one component result;
    the system further comprises a memory region accessible to the application within the virtual environment; and
    the callback invoking component is further configured to store the component result in the memory region.

7. The system of claim 1, wherein the component service is configured to initiate interactions with the hardware components of the device on behalf of the applications.

8. A method of fulfilling component requests received from applications within a virtual environment on a device executing on a device having a processor and at least two hardware components that each have an associated capability, the method comprising:
    executing on the processor instructions configured to:
        upon receiving from an application executing within the virtual environment a component request specifying a callback of the application and a one of the hardware components the capability of which is to be invoked,
            store the callback associated with the component request and the application,
            send the component request to the one hardware component for completion, and
            resume execution of the application within the virtual environment;
        upon detecting a completion of the component request that yields at least one component result, retrieve the callback associated with the component request; and
        scrutinize the component request and one or more of the at least one component result for at least one of
            inclusion of malicious code and
            an accessing or leakage of private user information.

9. The method of claim 8, wherein:
    completion of the component request comprises at least one component result;
    the instructions are configured to, upon receiving at least one component result from the component, generate a condensed component result having a smaller size than the at least one component result; and
    the instructions are further configured to provide the condensed component result of the component request to the application within the virtual environment.

10. The method of claim 8, wherein the instructions are further configured to, upon receiving the component request, initiate a worker process outside of the virtual environment and configured to:
    send the component request to the one hardware component; and
    notify the application associated with the callback of the completion of the component request.

11. The method of claim 8, wherein the instructions are further configured to, upon receiving a component request from an application executing outside of the virtual environment on the device:
  store the callback associated with the component request and the application; and
  send the component request to the one hardware component.

12. The method of claim 8, wherein the instructions are further configured to:
  upon receiving a component request from a remote process executing on a second device:
    store the callback associated with the component request and the remote application; and
    send the component request to the one hardware component; and
  upon detecting a completion of a component request associated with a remote process, invoke the callback on behalf of the remote application.

13. The method of claim 12, wherein the remote process initiates the component request on behalf of the application executing within the virtual environment on the device.

14. The method of claim 13, wherein:
  the application comprises at least one credential;
  the component request received from the remote process includes at least one credential authenticating the component request on behalf of the application; and
  the instructions are further configured to, before sending the component request to the one hardware component, authenticate the credential of the component request.

15. The method of claim 8, wherein:
  the component request specifies at least one requested result type that has been requested by the application; and
  generating the condensed component result comprises generating a condensed component result excluding at least one portion of the component result that is not related to the at least one requested result type.

16. The method of claim 8, wherein:
  the instructions are further configured to receive from a user of the device a condensing preference; and
  generating the condensed component result comprises generating a condensed component result using the condensing preference.

17. A computer-readable storage device comprising instructions that, when executed on a processor of a device comprising a virtual environment and at least one component, cause the execution of a method of fulfilling component requests received from an application executing within the virtual environment, the method comprising:
  upon receiving from the application a component request specifying a component and a callback of the application,
    storing the callback associated with the component request and the application,
    sending the component request to the component, and
    resuming execution of the application within the virtual environment;
  upon receiving from the application within the virtual environment a device capability enumeration request, enumerating for the application the component capabilities of respective components of the device; and
  upon receiving from the application within the virtual environment a device capability request specifying a component capability, translating the device capability request into a component request specifying a one of the at least one component having the component capability specified by the device capability request.

18. The computer-readable storage device of claim 17, further comprising, upon detecting a completion of the component request by the component retrieving the callback associated with the component request, and invoking the callback on behalf of the application.

19. The computer-readable storage device of claim 17, wherein:
  the component request specifies a component capability of the component; and
  the method further comprises:
    upon receiving a component request, present to a user an offer to initiate the component request identifying the component capabilities requested by the application; and
    initiate the component request to the component only after receiving from the user an acceptance of the offer.

20. The computer-readable storage device of claim 17, wherein the method further comprises, upon receiving from the application within the virtual environment a component enumeration request, enumerating for the application the components of the device that are identifiable in a component request.

* * * * *